US009417148B2

(12) United States Patent
Eyring et al.

(10) Patent No.: US 9,417,148 B2
(45) Date of Patent: Aug. 16, 2016

(54) INDICATING ASSEMBLY FOR A PRESSURIZED CONTAINER

(71) Applicant: Western/Scott Fetzer Company, Westlake, OH (US)

(72) Inventors: Bryan Eyring, Lakewood, OH (US); Gregory Eytchison, Huron, OH (US); Ryan Pereira, Westlake, OH (US)

(73) Assignee: Western/Scott Fetzer Company, Westlake, OH (US)

( * ) Notice: Subject to any disclaimer, the term of this patent is extended or adjusted under 35 U.S.C. 154(b) by 109 days.

(21) Appl. No.: 14/336,369

(22) Filed: Jul. 21, 2014

(65) Prior Publication Data

US 2015/0027361 A1   Jan. 29, 2015

Related U.S. Application Data

(60) Provisional application No. 61/858,896, filed on Jul. 26, 2013.

(51) Int. Cl.
*G01L 19/10* (2006.01)
*G01L 19/16* (2006.01)
*G01L 7/16* (2006.01)

(52) U.S. Cl.
CPC .............. *G01L 19/10* (2013.01); *G01L 7/163* (2013.01); *G01L 7/166* (2013.01); *G01L 19/16* (2013.01)

(58) Field of Classification Search
CPC ......... G01L 19/10; G01L 19/16; G01L 7/163; B65D 51/24; G09F 9/00
USPC ......... 116/201, 202, 264, 266, 271, 298–299, 116/306–309, 327, DIG. 1, DIG. 23; 40/111, 40/113, 310–311
See application file for complete search history.

(56) References Cited

U.S. PATENT DOCUMENTS

| 1,397,728 | A | * | 11/1921 | Evans | G01L 19/08 73/744 |
| 3,247,824 | A | * | 4/1966 | Rodgers | G01L 19/12 116/271 |
| 3,422,791 | A | * | 1/1969 | Rosaen | B01D 35/143 116/268 |
| 3,492,968 | A | * | 2/1970 | Workman, Jr. | G01L 19/12 116/270 |
| 4,020,784 | A | * | 5/1977 | Greene | G01L 7/00 116/268 |
| 4,164,196 | A | * | 8/1979 | Stradella | G01L 7/16 116/272 |
| 4,794,949 | A | | 1/1989 | Sakai | |
| 5,027,740 | A | * | 7/1991 | Kramer | B60C 23/0496 116/272 |

(Continued)

OTHER PUBLICATIONS

Notification of Transmittal of International Search Report and Written Opinion (10 pages) for International App. No. PCT/US2014/047651, mailing date Nov. 13, 2014.

*Primary Examiner* — Laura Martin
*Assistant Examiner* — Tania Courson
(74) *Attorney, Agent, or Firm* — Tarolli, Sundheim, Covell & Tummino LLP

(57) ABSTRACT

An indicating assembly for a container in which pressurized fluid is stored comprises a valve assembly connected to the pressurized container and having a fluid passage for receiving the pressurized fluid and a piston movable within the valve assembly along a longitudinal axis in response to fluid pressure within the fluid passage. The assembly further comprises an indicating member movable in response to longitudinal movement of the piston between a first condition providing a first indicator portion representing fluid pressure below a threshold pressure and a second condition providing a second indicator portion representing fluid pressure above the threshold pressure.

16 Claims, 30 Drawing Sheets

(56) References Cited

U.S. PATENT DOCUMENTS

| | | |
|---|---|---|
| 5,135,023 A | 8/1992 | Ross |
| 5,339,764 A | 8/1994 | Singbartl |
| 5,734,109 A | 3/1998 | Thanscheidt |
| 5,929,330 A | 7/1999 | Ford |
| 5,983,826 A * | 11/1999 | Lohde ................ F16K 37/0016 116/277 |
| 5,992,239 A | 11/1999 | Boehringer et al. |
| 6,531,960 B1 * | 3/2003 | Gladstone ........... B60C 23/0496 116/34 R |
| 7,134,449 B2 | 11/2006 | Frederiksen |
| 7,237,570 B2 | 7/2007 | Gamard et al. |
| 7,823,606 B2 | 11/2010 | Nicolini |
| 8,550,114 B2 | 10/2013 | Levine et al. |
| 2004/0211353 A1 | 10/2004 | Lawrence et al. |

* cited by examiner

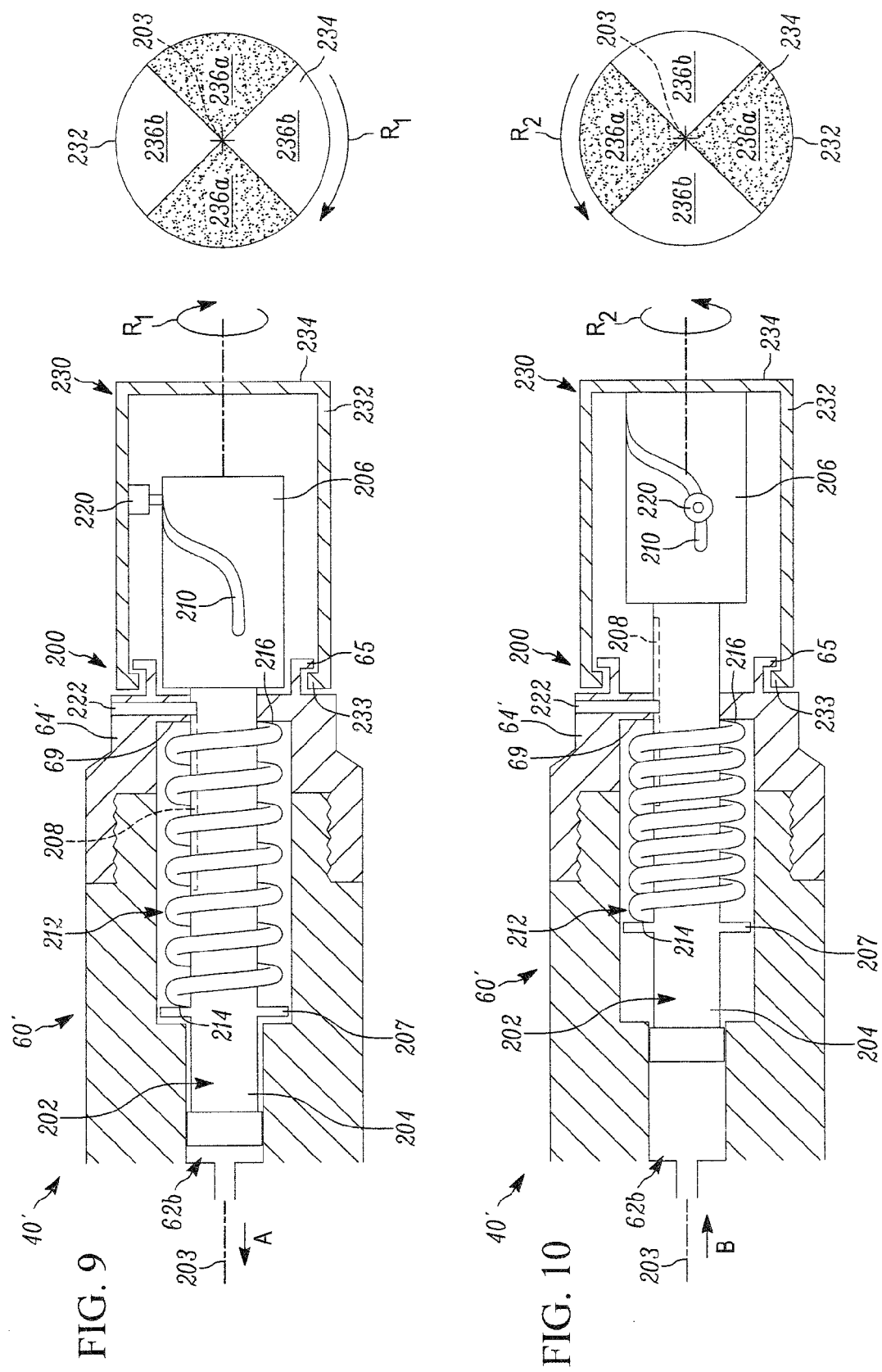

INDICATING ASSEMBLY FOR A PRESSURIZED CONTAINER

CROSS REFERENCES TO RELATED APPLICATIONS

The following application claims priority to U.S. Provisional Patent Application Ser. No. 61/858,896 filed Jul. 26, 2013 entitled INDICATING ASSEMBLY FOR A PRESSURIZED CONTAINER. The above-identified application is incorporated herein by reference in its entirety for all purposes.

TECHNICAL FIELD

The present disclosure relates to pressurized containers and, in particular, relates to an indicating assembly having an indicator device that changes based upon the fluid pressure within the container.

BACKGROUND

Conventional dial indicators for pressurized containers provide a visual display to users as to the amount of fluid and/or pressure stored in a container or pressure vessel. Users may include medical practitioners, and conventional dial indicators may be difficult to read, access, and/or to understand.

SUMMARY

An object of the present disclosure is to provide a new and improved indicating assembly for pressurized containers. The indicating assembly includes an indicator member that, in response to movement of a piston under fluid pressure, displays a different indicator based upon the fluid pressure within the container.

Another object of the present disclosure comprises an indication arrangement for a container in which pressurized fluid is stored having a valve assembly connected to the pressurized container and having a fluid passage for receiving the pressurized fluid, a piston movable within the valve assembly along a longitudinal axis in response to fluid pressure within the fluid passage, and an indicating member movable in response to longitudinal movement of the piston between a first condition providing a first indicator portion representing fluid pressure below a threshold pressure and a second condition providing a second indicator portion representing fluid pressure above the threshold pressure.

Yet another object of the present disclosure comprises a method of indicating pressure container contents, such as pressure in a cylinder valve assembly comprising the step of moving a piston in fluid communication with a high pressure port. The piston being coupled to an indicator member that moves to a high position based on the gas pressure, the piston moving under the influence of a spring bias to a low position when the spring force is more than the resulting gas force to indicate low pressure and a shroud design that allows the indicator member to be viewable in multiple viewing directions through a viewable lens.

While another object of the present disclosure comprises a method of indicating cylinder contents pressure in a cylinder valve assembly comprising the steps of moving a piston in fluid communication with a high pressure port. The piston being rotationally coupled via a pin to an indicator member that rotates to a high position based on the gas pressure, the piston including a helical first track to guide the pin and a second track that prevents rotation of the piston that includes a stop, the piston moving under the influence of a spring bias to a low position when the spring force is more than the resulting gas force to indicate low pressure, the indicator member being rigidly fixed to a body to prevent rotation of the piston and shroud design that allows the indicator member to be viewable in multiple directions through a viewable lens.

Another object of the present disclosure comprises a pressure indication assembly for a container in which pressurized fluid is stored. The pressure indication assembly comprises a valve assembly connected during use to a pressurized container having a fluid passage for receiving the pressurized fluid. The pressure indication assembly also comprises a piston movable within the valve assembly along a longitudinal axis in response to fluid pressure within the fluid passage, the piston further being coupled to a pin that is further coupled to an indicating member, the piston facilitating rotational movement of the pin and said indicator member during use based on relative gas pressure within the pressurized container, said piston including a helical track to rotationally guide the pin and indicator member during use. The indicating member is rotatably movable in response to longitudinal movement of the piston between a first condition providing a first indicator portion representing fluid pressure below a threshold pressure and a second condition providing a second indicator portion representing fluid pressure above the threshold pressure.

Other objects and advantages and a fuller understanding of the disclosure will be had from the following detailed description of the preferred embodiments and the accompanying drawings.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals refer to like parts unless described otherwise throughout the drawings and in which:

FIG. 9 illustrates the indicating assembly of FIG. 8 in a first condition;

FIG. 10 illustrates the indicating assembly of FIG. 8 in a second condition;

DETAILED DESCRIPTION

Referring now to the figures generally wherein like numbered features shown therein refer to like elements throughout unless otherwise noted, the present disclosure relates to pressurized containers and, in particular, relates to a indicating assembly having an indicator device that changes based upon the fluid pressure within the container. It should be appreciated that fluid stored within the container measured by the indicating assembly is typically oxygen or heliox for medical application and patients, other fluids and/or gases could also be measured by the indicating assembly without departing from the spirit and scope of the present disclosure.

Figure 1:
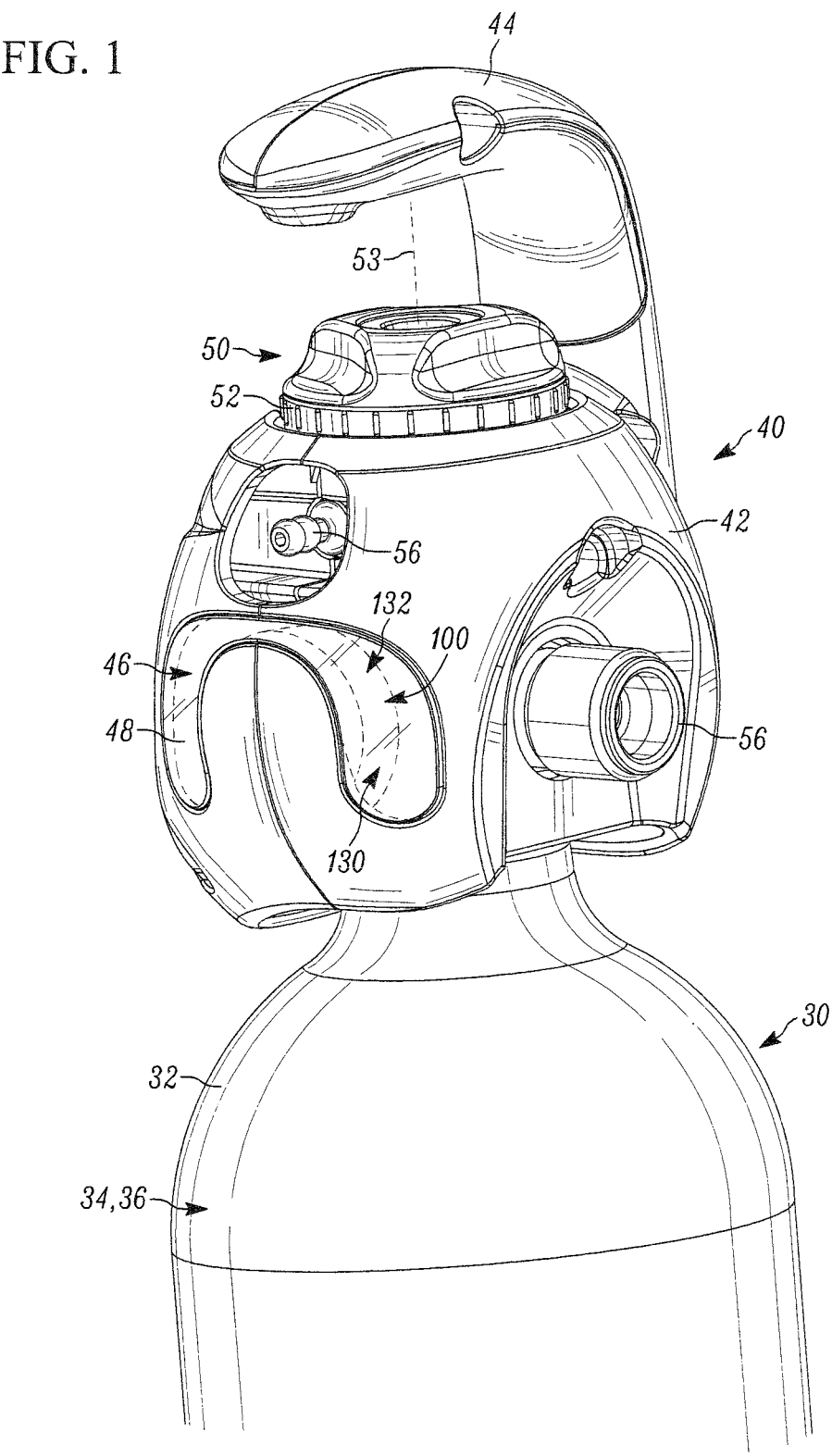
FIG. 1 is a schematic illustration of a valve assembly with an indicating assembly in a first condition.

Referring now to the figures, and in particular FIGS. 1-7 illustrate a valve assembly 40 coupled in fluid communication a pressurized container 30. The valve assembly 40 comprises an indication arrangement 100, providing visual guidance to a user, indicating the pressure of the fluid within the pressurized container 30 in accordance with the present disclosure. In FIG. 1, the container or vessel 30 constitutes a conventional container or gas tank in which pressurized fluid 36 is stored. The container 30 includes a wall 32 defining an interior space 34. The fluid 36 constitutes any fluid, gas, and/or liquid, e.g., oxygen, is held within the container 30 under pressure via conventional means that would be appreciated by those of ordinary skill in the art.

The valve assembly 40 is contained within a shroud or housing 42, having a handle 44 for facilitating transport. The housing 42 defines a viewing window 46 or opening on a predetermined side of the housing. In one example embodiment, the window 46 is removable for cleaning or replacement. In the illustrated example embodiment, the housing 42 is a two-piece molded plastic assembly held together by fasteners and connected along a seam-line 43. The viewing window 46 is positioned between the two molded pieces before the molded pieces are secured together by fasteners (not shown).

A clear or translucent cover 48 fills the viewing window 46 and is secured to the housing 42. The cover 48 may have magnification properties such that items visible through the cover are made larger. As shown in FIG. 1, the indicating arrangement 100 is readily viewable through the cover 48 from multiple viewing angles.

Figure 4:
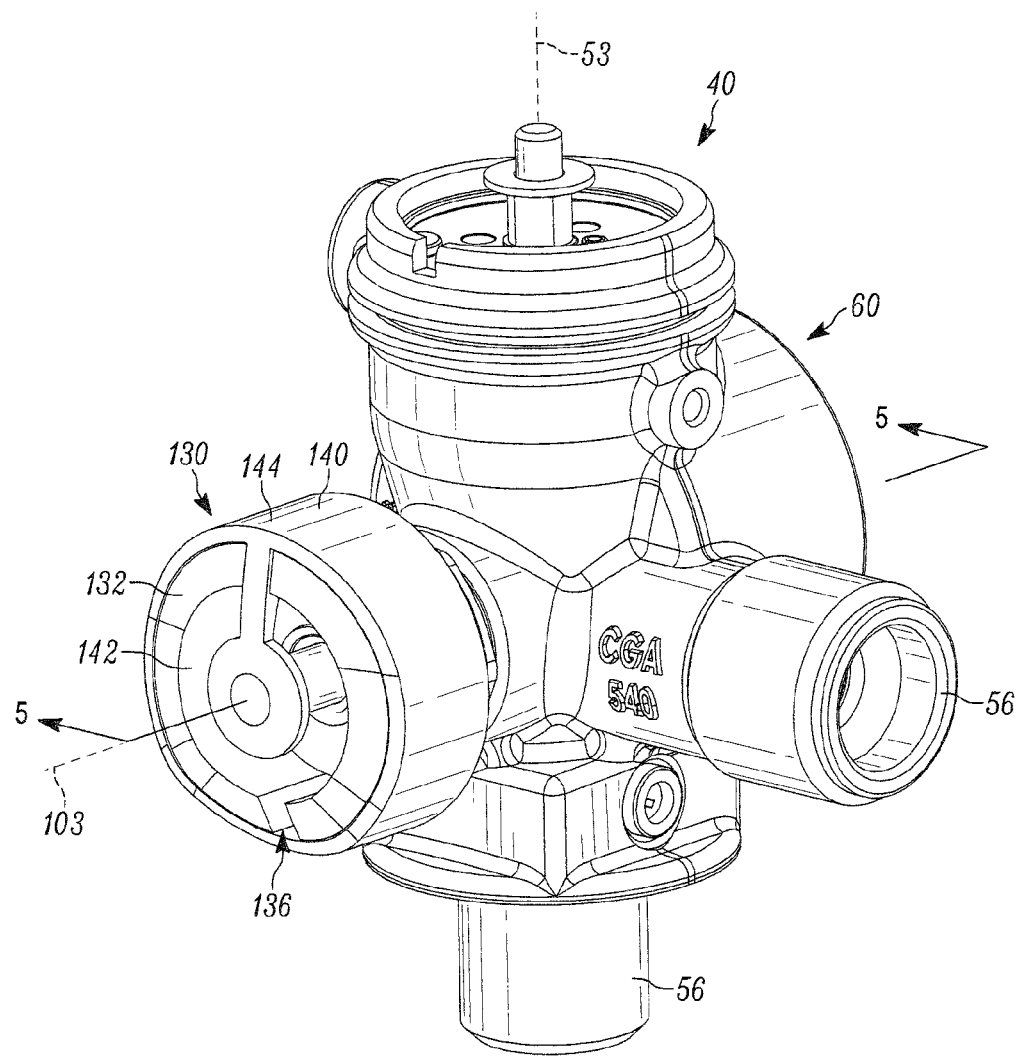
FIG. 4 is an isometric view of the valve assembly of FIG. 1 with the housing removed.
Figure 5:
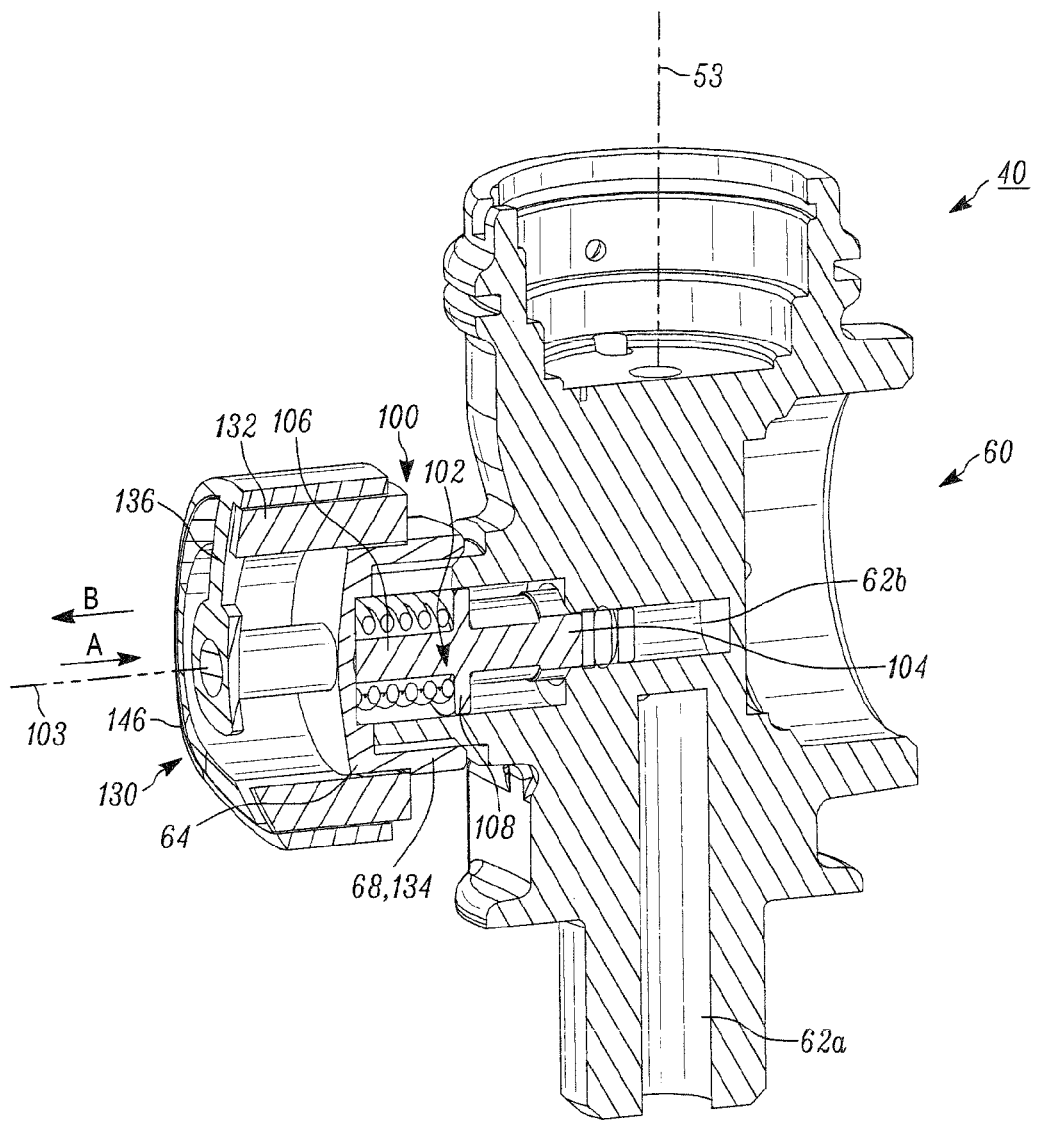
FIG. 5 is a section view taken along line 5-5 of FIG. 4.
Figure 12:
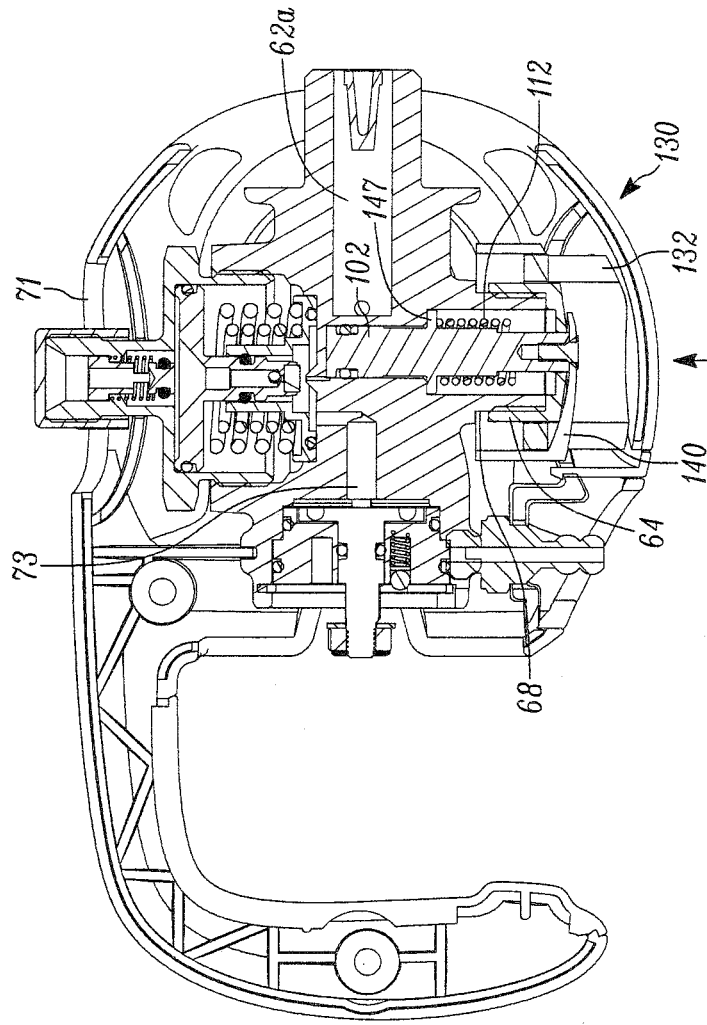
FIG. 12 is a section view of FIG. 11 along section lines A-A.
Figure 11:
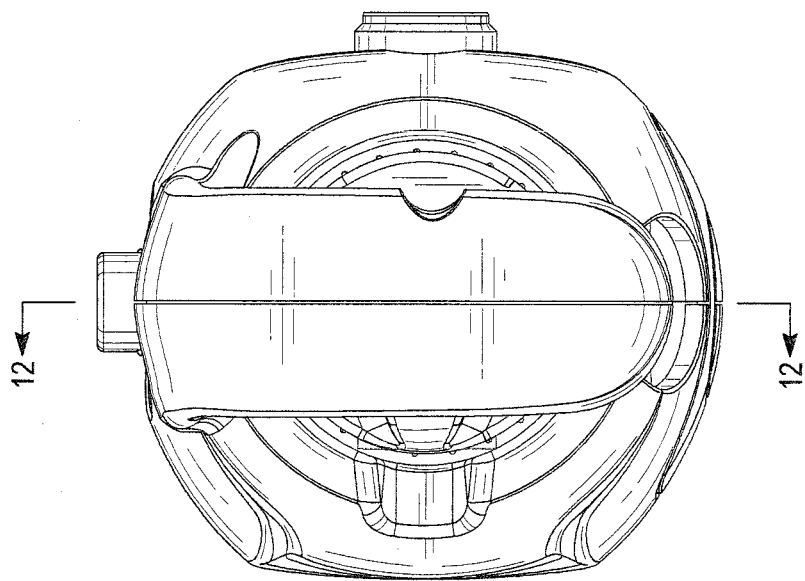
FIG. 11 is top view of the valve assembly constructed in accordance with one example embodiment of the present disclosure.
Figure 13:
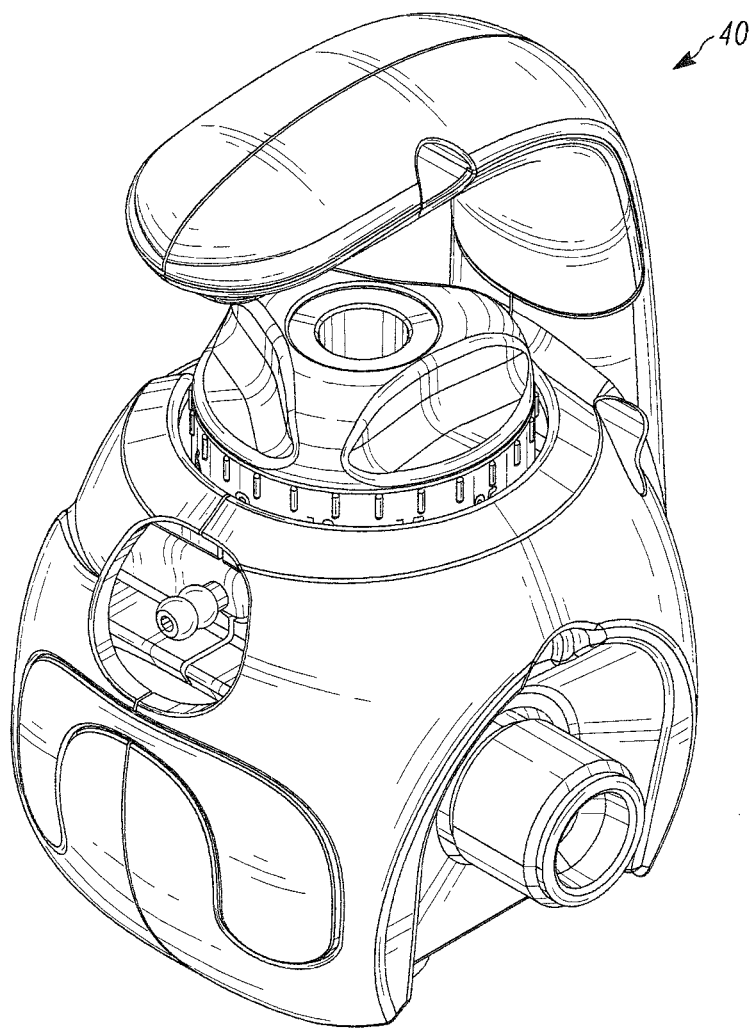
FIGS. 13-22 are various views of a valve assembly constructed in accordance with one example embodiment of the present disclosure.
Figure 14:
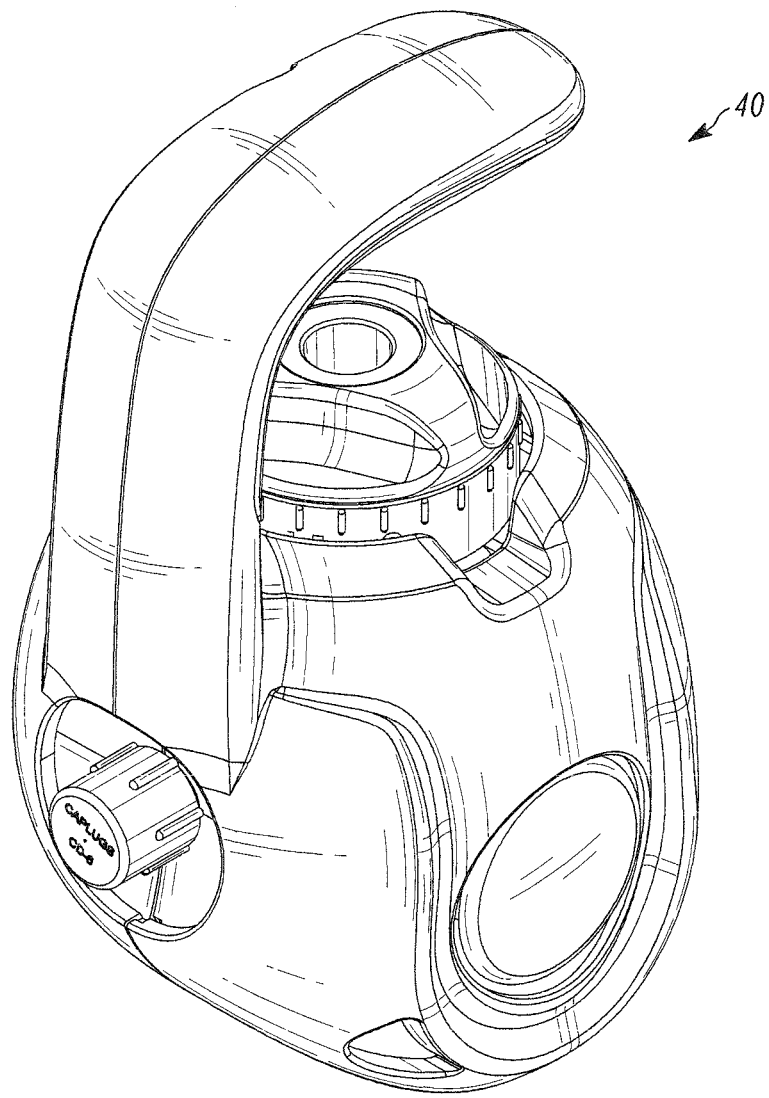
Figure 15:
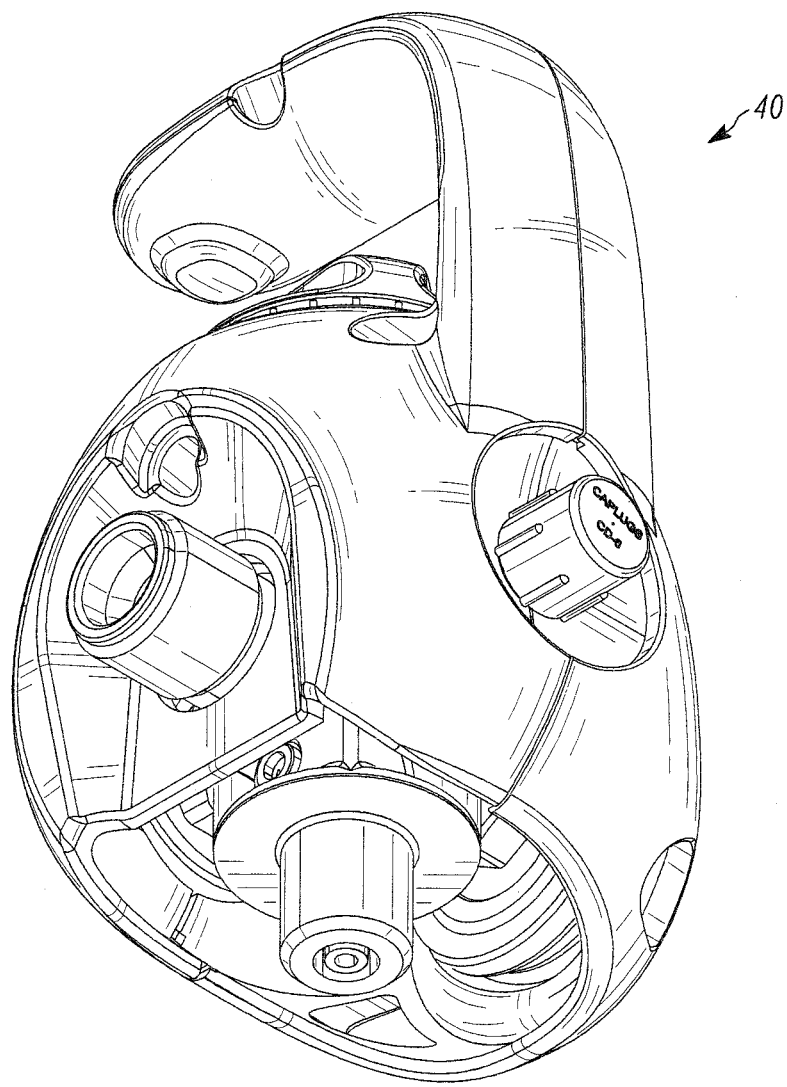

Referring to FIGS. 4 and 5, the valve assembly 40 includes a valve housing or body 60 for receiving pressurized fluid from the container 30 and directing the fluid to one or more desired outputs via a series of fluid connectors 56 positioned at various locations around the housing 42. The valve body 60 defines a first fluid passage 62a that receives pressurized fluid from the container 30 via a conventional fluid fitting and/or tube (not shown). The valve body 60 further defines a second fluid passage 62b in fluid communication with the first fluid passage 62a. As shown, the first and second fluid passages 62a, 62b extend perpendicular to one another through the valve body 60, although alternative configurations for the fluid passages are contemplated. In any case, the second fluid passage 62b extends through the valve body 60 and terminates at an end cap 64 within the housing 42. A flow regulating knob 50 (FIG. 1) bearing pressure-related indicia 52 is secured to the valve body 60 and controls the flow of pressurized fluid from the container 30 through the first passage 62a and second passage 62b into a pressure regulator 71 through an outlet port 73 (see FIG. 12) in a conventional manner.

Figure 2:
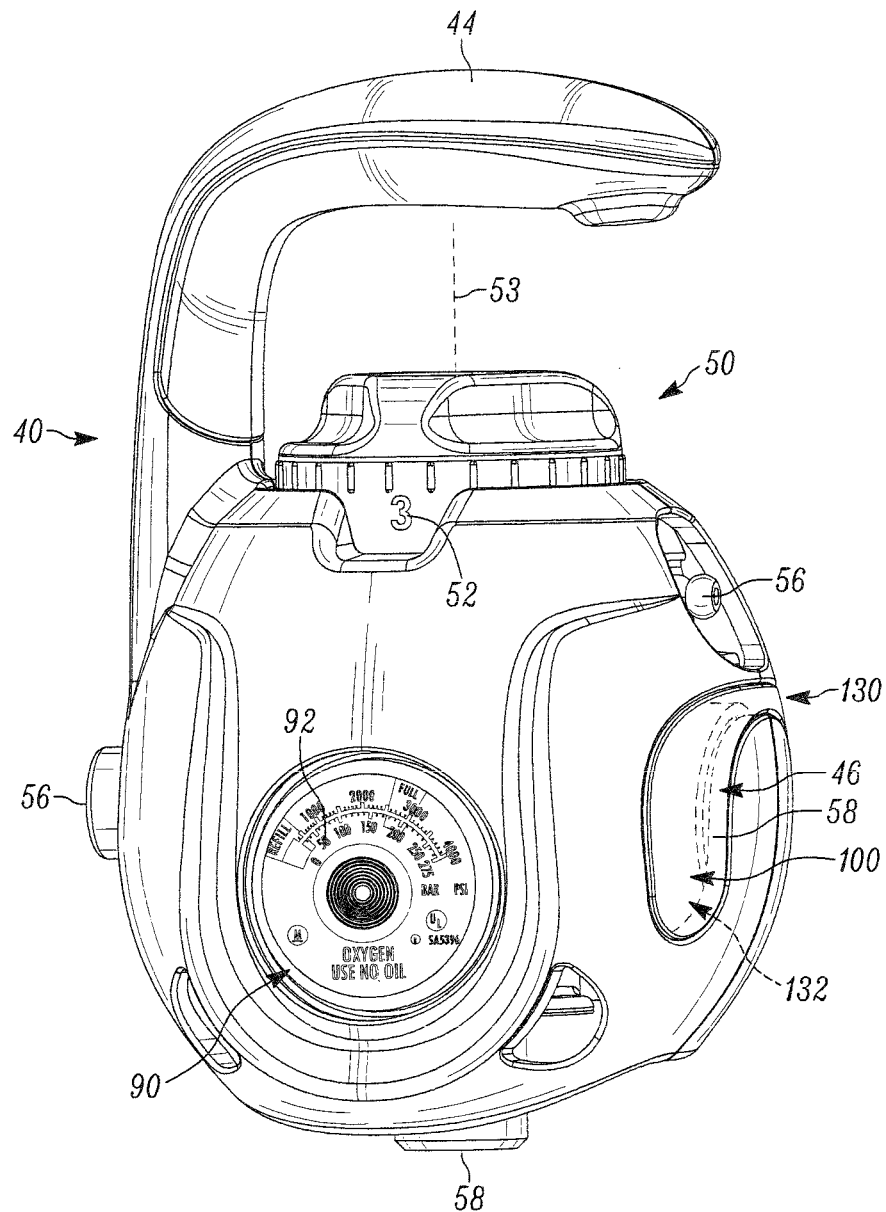
FIG. 2 is a front view of the valve assembly of FIG. 1.
Figure 3:
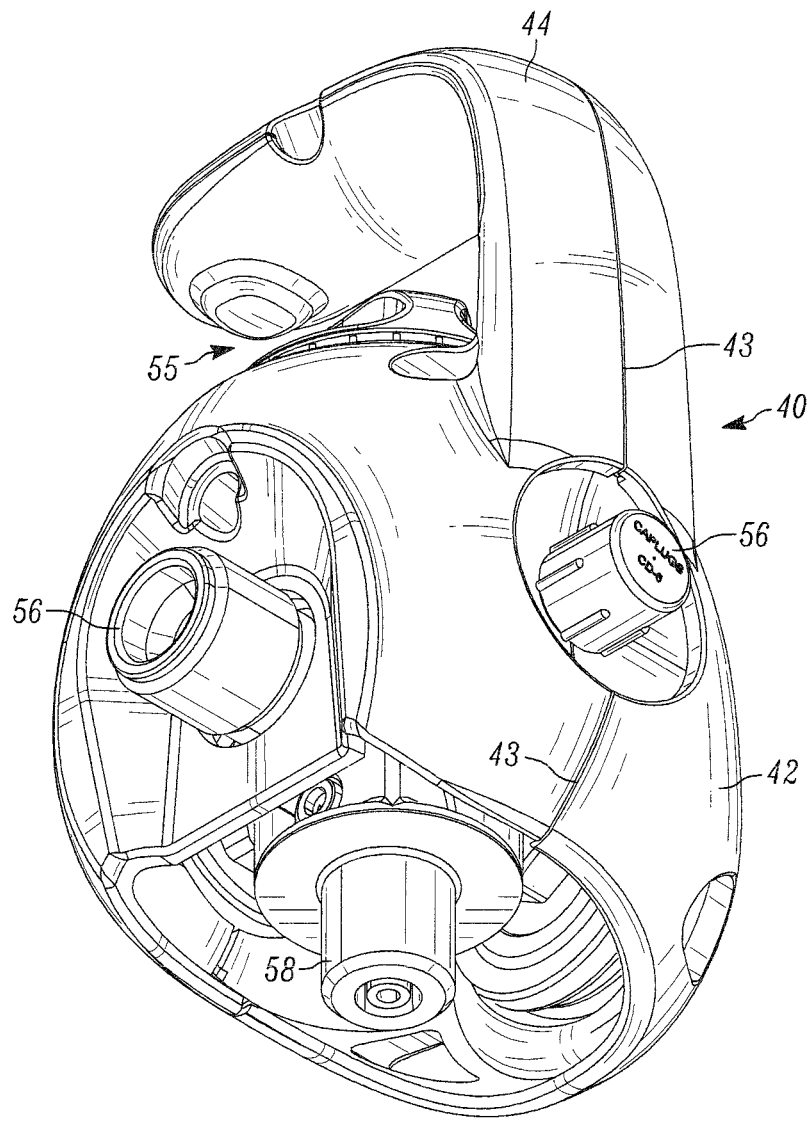
FIG. 3 is a bottom view of the valve assembly of FIG. 1.

Referring to FIG. 2, an indicator gauge 90 is connected to the housing 42 and is in fluid communication with the first passage 62a in the valve body 60. The indicator gauge 90 constitutes a conventional needle indicator with indicia 92 that provides visual feedback of the fluid pressure within the container 30. The indication arrangement 100 is secured to the valve body 60 and provides further visual indication of the fluid pressure within the container 30. The indication arrangement 100 includes a piston 102 (see FIG. 5) that includes a portion moveable within the valve body 60 and an indicator device or indicator member 130 that shows different visual designations of the fluid or pressure within the tank 30 based upon movement of the piston.

Referring to FIG. 5, the piston 102 is positioned within the second passage 62b and is configured for longitudinal movement along an axis 103 within and relative to the second passage. The piston 102 has an elongated shape and extends along the axis 103 from a first end 104 to a second end 106. The piston 102 has a circular cross-section, but may alternatively have any polygonal cross-section that matches the cross-section of the second passage 62b in accordance with the present disclosure. A flange or projection 108 extends radially outward from the piston 102. A spring 112 surrounds the piston 102 within the end cap 64 of the valve assembly 40. The spring 112 in a high pressure or normal operation condition, is compressed by the annular flange 108, as the pressure pushes the flange and spring against the cap 64 along the axis 103. The spring 112 is an extension spring that extends from a first end 114 to a second end 116.

Figure 6:
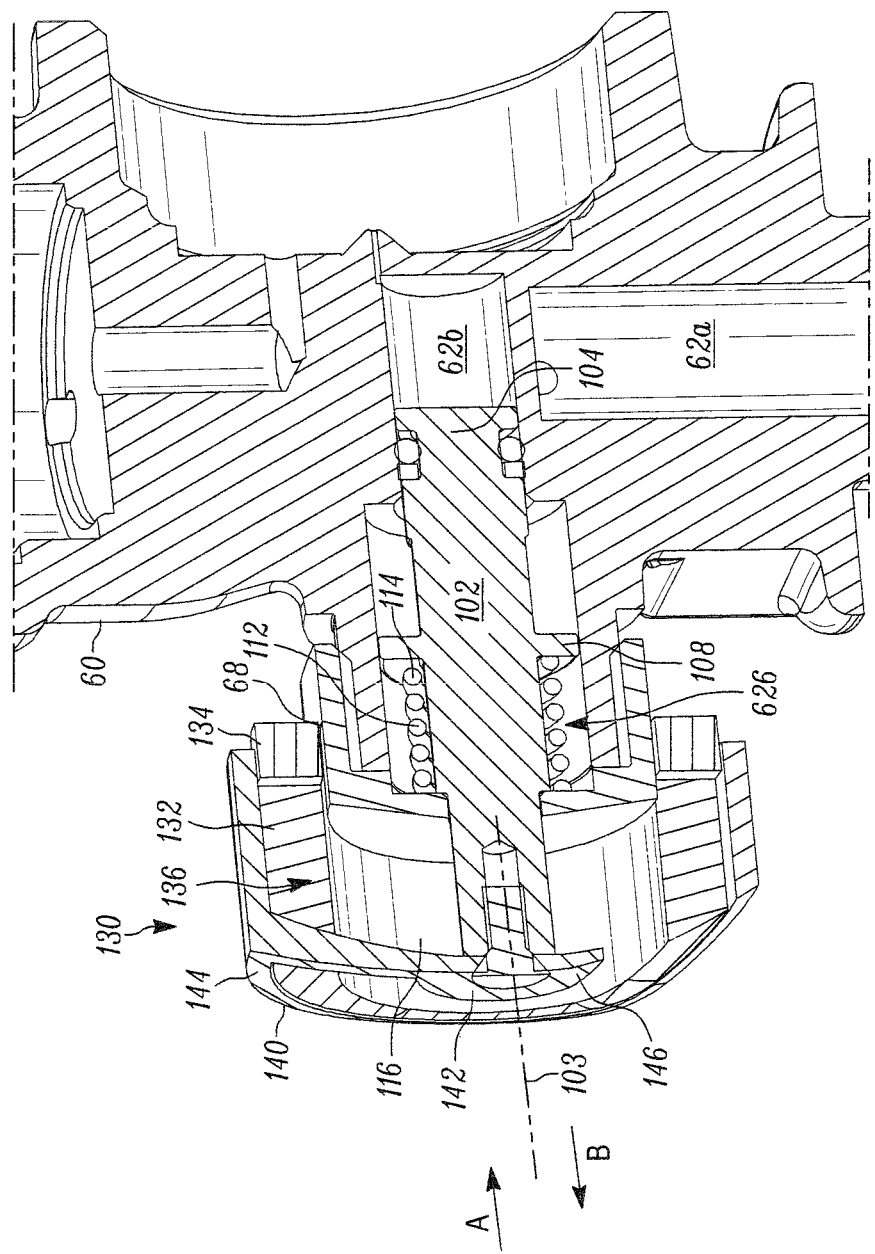
FIG. 6 is an enlarged view of a portion of FIG. 5.

Referring to FIGS. 5 and 6, the indicating arrangement 100 includes an indicator member 130 secured to the piston 102 for providing a visual indication of the pressure of the fluid within the passages 62a, 62b and, thus, visual indication within the container 30 based upon the longitudinal position of the piston 102 along the axis 103.

The indicator member 130 includes a substantially fixed first portion 132 secured to the valve body 60 and a second portion 140 secured to the piston 102 and movable therewith relative to the first portion 132. The first portion 132 has an annular configuration that encircles the end cap 64 and the second end 106 of the piston 102. The first portion 132 includes a flange 134 that is secured to a recess 68 in the end cap 64 to prevent longitudinal movement of the first portion 132 relative to the end cap, along the axis 103 towards the first end 104 of the piston 102.

The second portion 140 includes an inner member 142 secured to the second end 106 of the piston 102 and an outer member 144 that is concentric with the first portion 132. The outer member 144 is annular in shape and connected to the inner member 142 by a radially extending connecting member 146. The connecting member 146 extends through a passage 136 in the first portion 132 configured to allow the second portion 140 to move longitudinally long the axis 103 relative to the first portion.

The first and second portions 132, 140 of the indicator member 130 are visually distinct from one another, e.g., color, texture, fluorescence, etc. Alternatively or additionally, the first and second portions 132, 140 may be marked with different shapes, patterns, text, indicia or otherwise provided with any differentiating visual or tactile indication. As will be discussed, only one of the first and second portions 132, 140 of the indicator member 130 is viewable through the viewing window 46 at any given time and uniquely indicates whether the fluid pressure within pressurized container 30 is above or below a predetermined, threshold amount. In addition, the valve assembly 40 and its location of the indication arrangement 100 is advantageously constructed such that the indicating assembly can be seen at least five of the six viewing perspectives that exists to a user or medical professional.

Prior to fluid from the container 30 entering the valve assembly 40, the spring 112 biases the piston 102 in the direction indicated generally by the arrow A further into the valve body 60 (see FIG. 12) in the collapsed or first position. Because the second portion 140 of the indicator member 130 is secured to the second end 106 of the piston 102, the second portion also moves with the piston in the direction A. The first portion 132 of the indicator member 130, however, is prevented from moving in the direction A due to the engagement of the flange 134 on the first portion 132 with the recess 68 in the end cap 64. Consequently, the second portion 140 moves in the direction A with the piston 102 relative to the stationary first portion 132. This relative movement is facilitated by the passage 136 in the first portion 132 through which the connecting member 146 of the second portion 140 moves.

In this unpressurized state, when the spring 112 is extended, biasing the flange 108 of the piston 102 inward. In this condition, the second portion 140 of the indicator member 130 is retracted from the first portion 132 to place the indication arrangement 100 in a first condition (see FIG. 12) in which the first portion is exposed or viewable though the viewing window 46 in the housing 42 (see FIG. 1). In this first low pressure condition, the second portion 140 of the indicator member 130 is retracted out of sight into the housing 42. The viewing window 46 is advantageously contoured along the housing 42 to allow the indicating member 130 to be viewed from multiple directions, e.g., top, left side, right side, and front as viewed in FIG. 1. Accordingly, one can as well view the first portion 132 of the indication arrangement 100 through the viewing window. Since the first (low pressure) condition exists prior to pressurized fluid entering the valve assembly 40, the first portion 132 of the indicating assembly 100—which exhibits a unique indicator different from the second portion 140—indicates that the valve assembly 40 is under low pressure.

The flow regulating knob 50 is turned to pressurize the valve assembly 40 to a desired amount. When the container 30 is coupled or in fluid communication with the valve body 60, the pressurized liquid 36 within the container flows into the first and second passages 62a, 62b of the valve body. Referring to FIGS. 5 and 6, fluid pressure inside the second passage 62b acts on the first end 104 of the piston 102 against the spring bias of the spring 112. When the fluid pressure reaches or exceeds a predetermined amount, e.g., 500 psi, the spring bias is overcome and the piston 102 is pushed in or compressed the direction indicated generally by the arrow B in FIG. 5 towards the end cap 64. Since the second portion 140 of the indicator member 130 is secured to the second end 106 of the piston 102, the second portion moves with the piston in the direction B until the second portion overlies the first portion 132 of the indicator member 130.

Figure 7:
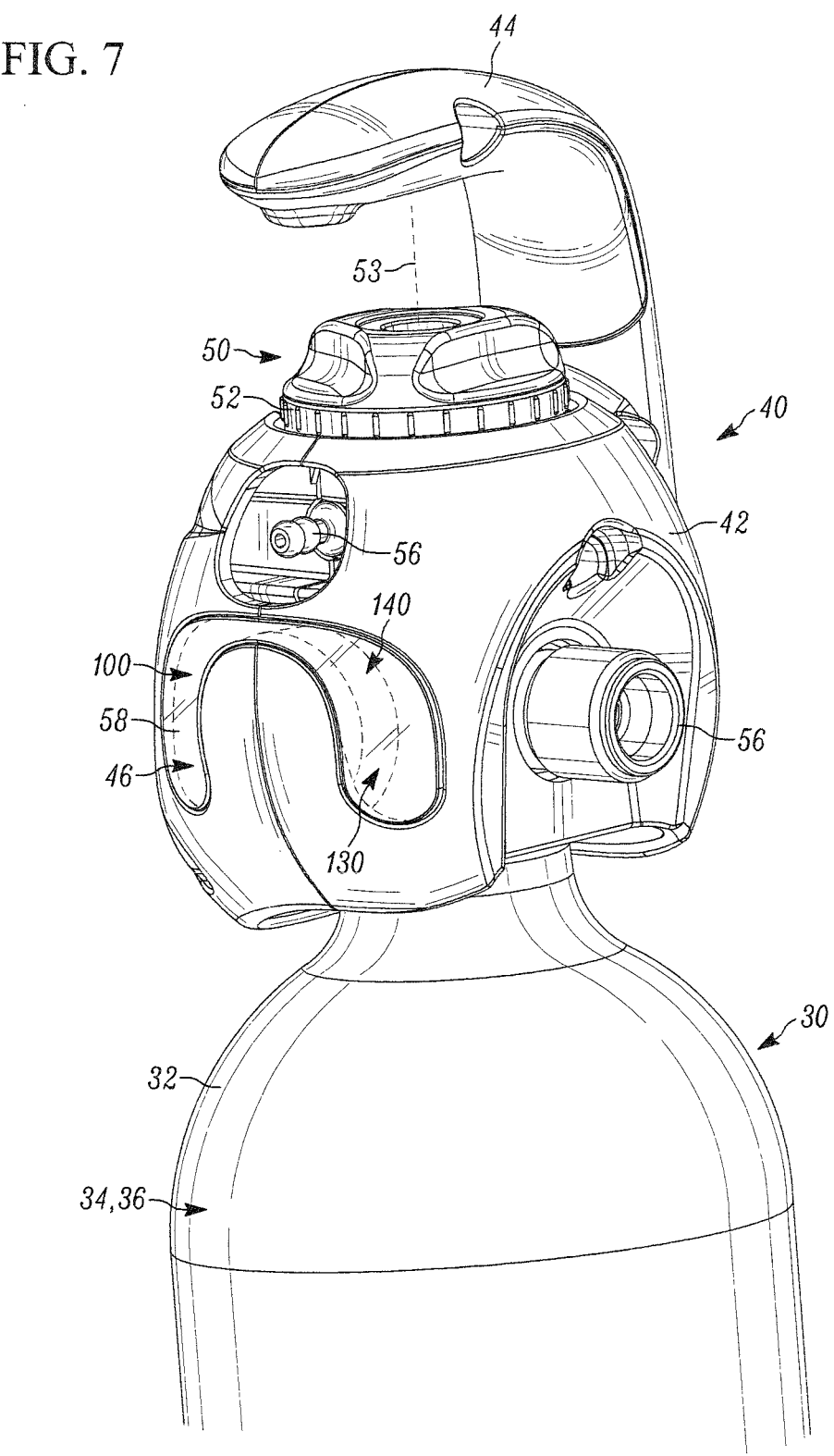
FIG. 7 is a schematic illustration of the valve assembly of FIG. 1 with the indicating assembly in a second condition.

In this configuration, the indicating assembly 100 is placed in a second (high or normal pressure) condition in which the second portion 140 covers the first portion 132 such that only the second portion is viewable though the viewing window 46 in the housing 42 (see FIG. 7). Because the second condition exists only when the spring 112 is compressed by the flange 108, overcome due to sufficient fluid pressure within the fluid passages 62a, 62b, the second portion 140 of the indication arrangement 100—which exhibits a unique indicator different from the first portion 132—indicates that the valve assembly 40 is under high pressure. As with the visibility of the first portion 132 in the first (low pressure) condition of the indication arrangement 100, the viewing window 46 advantageously allows the second portion 140 to be viewable from multiple directions when the indicating device is in the second condition.

Due to the configuration of the indication arrangement 100, the spring force of the spring 112 therefore dictates when the indicating device transitions between the first condition and the second condition. Prior to the fluid pressure acting on the piston 102 overcoming the spring force, the indication arrangement 100 remains in the first condition in which only the first portion 132 is visible through the viewing window 46 (see FIG. 12). Once the spring bias or force is overcome, the indicating assembly 100 switches to the second condition in which only the second portion 140 is visible through the viewing window 46. Accordingly, the first portion 132 provides visual indication whenever the fluid pressure within the valve assembly 40 and, thus, the fluid pressure within the container 30, is below the threshold fluid pressure level required to overcome the spring force or bias 112. Likewise, the second portion 140 provides visual indication whenever the fluid pressure within the valve assembly 40 and, thus, the fluid pressure within the container 30, is at or above the threshold fluid pressure level required to overcome the spring force 112.

At some point, the reduced fluid pressure is insufficient to overcome the bias or spring constant of the spring 112. Consequently, the spring 112 moves the piston 102 back in the direction A until the second portion 140 is retracted away from the first portion 132 and the indicating device returns to the first (low pressure) condition in which only the first portion is viewable through the viewing window 46. In one example embodiment, the change from low pressure to high pressure or vise versa, occurs substantially instantaneously, so that movement of the second portion is quick once pressure is below the threshold pressure.

It is clear from the above that the piston 102 moves the second portion 140 of the indicator member 130 relative to the first portion 132 based upon the fluid pressure within the valve assembly 40. Since the first and second portions 132, 140 of the indicator member 130 are visually distinct from one another, e.g., color, texture, fluorescence, etc., the indication arrangement 100 of the present disclosure therefore provides visual indication of the fluid pressure within the valve assembly 40 and the container 30.

Figure 8:
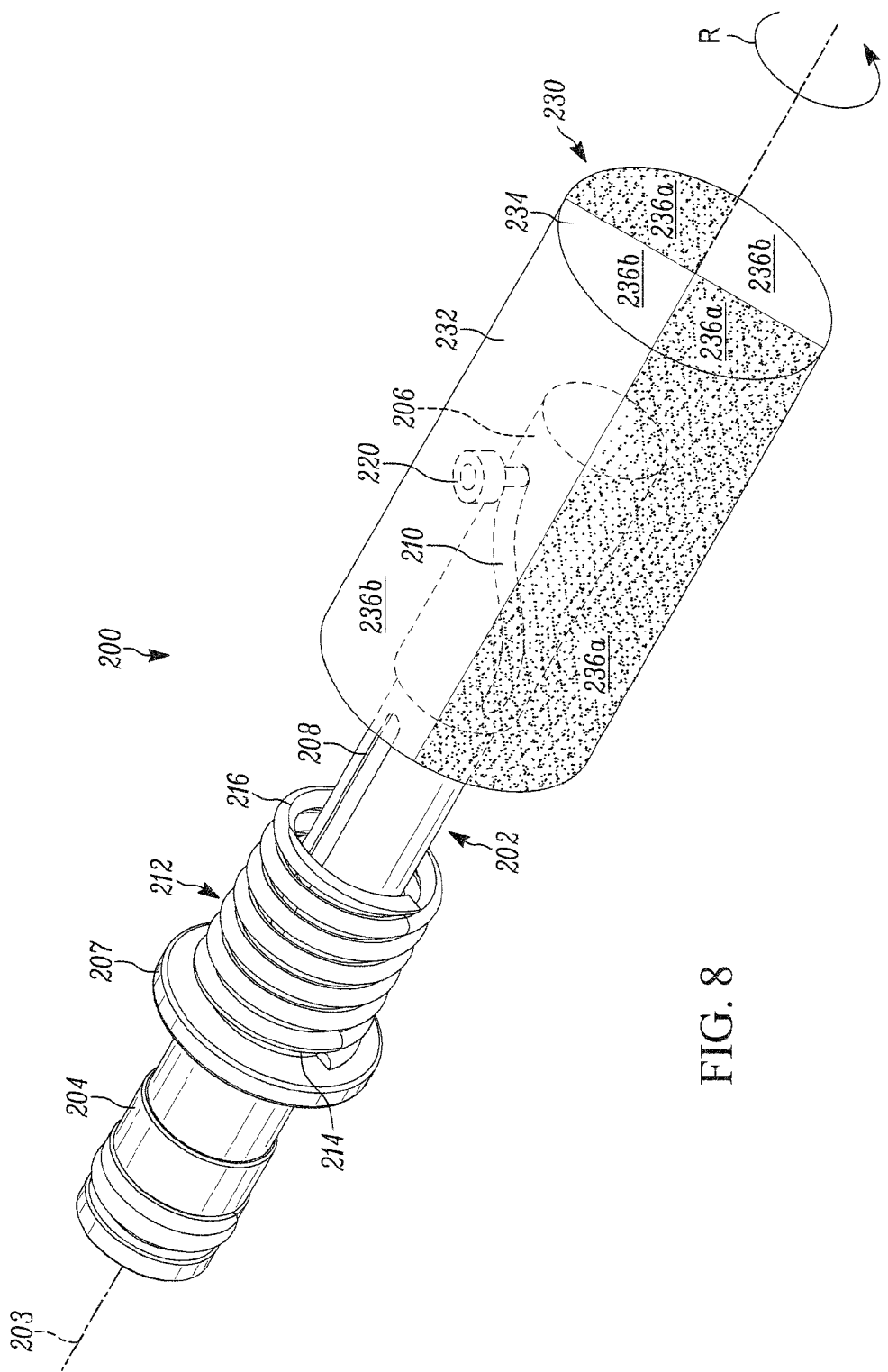
FIG. 8 illustrates an indicating assembly constructed in accordance with another aspect of the present disclosure.

An indication arrangement 200 in accordance with another aspect of the present disclosure is illustrated in FIGS. 8-10. Similar to the indication arrangement 100 of FIGS. 1-7, the indication arrangement 200 of FIGS. 8-10 includes a piston 202 that is moveable within the valve body 60' and an indicator member 230 that exhibits different indications based upon movement of the piston. In the indication arrangement 200, however, the indicator member 230 rotates in response to longitudinal movement of the piston 202 within the valve body 60'. Features in FIGS. 8-10 that are similar but not identical to those in FIGS. 1-7 are given the suffix "'".

Referring to FIG. 8, the piston 202 has an elongated shape and extends along an axis 203 from a first end 204 to a second end 206. The piston 202 has a circular cross-section but may alternatively have any polygonal cross-section concentric to the cross-section of the second passage 62b in the valve body 60a in accordance with the present disclosure. A flange or projection 207 extends radially outward from the axis 203 of the piston 202. A spring 212 is disposed around the piston 202 and includes a first end 214 positioned nearer the first end 204 of the piston 202 and a second end 216 positioned nearer the second end 206 of the piston.

The piston 202 includes a series of recesses or tracks 208, 210 for controlling operation of the indicating device 200. In particular, a first track or recess 208 extends along the piston 202 and generally parallel to the axis 203. The recess 208 is positioned between the flange 207 and the second end 206 of the piston 202. A second, actuation track or recess 210 extends around the second end 206 of the piston 202. In one example, the recess 210 extends in a helical pattern around the axis 203 of the piston 202 and longitudinally towards the first end 204 of the piston.

The indication arrangement 200 includes an indicator member 230 that extends around the second end 206 of the piston 202 for providing a visual indication of the pressure of the fluid within the container 30 based upon the longitudinal position of the piston along the axis 203. The indicator member 230 constitutes a tubular body that surrounds the second end 206 of the piston 202. The tubular member 230 includes an annular outer surface 232 and a planar end surface 234. The end surface 234 is divided into an equal number of discrete, alternating sections or portions 236a and 236b. Collectively, the sections 236a, 236b alternate around the entire 360° arc circumscribing the axis 203. In one example, the end surface 234 is divided into four alternating sections 236a, 236b with each occupying a 90° segment about the axis 203.

The sections 236a, 236b are visually different from one another so as to be readily distinguishable from each other. For example, the sections 236a, 236b may be different colors and/or have varying luminescence, texture, patterns or any other construction that visually distinguishes the sections 236a from the sections 236b. In any case, the annular surface 232 exhibits the same alternating pattern of differently configured sections 236a, 236b as the end surface 234 such that the sections extend around the entire circumference of the indicator member 230.

FIGS. 9 and 10 illustrate the indicating device implemented into the valve body 60' of the valve assembly 40'. Referring to FIG. 9, the piston 102 is positioned within the second passage 62b and extends through the valve body 60' and the end cap 64'. More specifically, the first end 204 of the piston 202 is positioned nearer the first passage 62a of the valve body 60' and the second end 206 of the piston is positioned nearer the end cap 64'. In this configuration, the spring 212 is retained between the flange 207 on the piston 202 and an inner surface 69 of the end cap 64' such that the spring cannot exit the valve body 60'. A pin 222 extends through the cap 64' and into the first recess 208 in the valve body 202. The pin 222 is rigidly secured to the cap 64' and prevents rotation of the valve body 202 about the axis 203 during operation of the indication arrangement 200.

The indicator member 230 is rotatably secured to the end cap 64' via cooperating projections 65, 233 on the end cap and indicator member, respectively. The projections 65, 233 allow for relative rotation between the indicator member 230 and the end cap 64' about the axis 203 but prevent substantial longitudinal movement of the indicator member along the axis 203 relative to the end cap. The indicator member 230 surrounds and encloses the second end 206 of the piston 202 when connected to the end cap 64'.

A pin or projection 220 extends radially inward from the indicator member 230 and into the second recess 210 on the second end 206 of the piston 202. The pin 220 may be integrally formed with the indicator member 230 or may be separately formed and secured to the indicator member. In any case, the pin 220 is rigidly secured to the indicator member 230 such that movement of the pin results in movement of indicator member.

Prior to fluid from the container 30 entering the valve assembly 40', or when fluid pressure within the valve assembly 40' is below the threshold amount corresponding with the spring bias of the spring 212, the spring biases the piston 202 in the direction indicated generally by the arrow A in FIG. 9 further into the valve body 60'. The piston 202 moves [or has moved] longitudinally along the axis 203 in the direction A as the spring 212 extends until the pin 222 reaches the end of the first recess 208 adjacent the second end 206 of the piston. The spring 212 may or may be not fully extended when the pin 222 reaches the end of the first recess 208. As noted, the pin 220 is secured to and is rotatable with the indicator member 230, which cannot move longitudinally with the piston 202. Furthermore, the piston 202 cannot rotate within the valve body 60' due to the engagement between the pin 222 and the first recess 208. Accordingly, since the pin 220 extends into the second recess 210, longitudinal movement of the piston 202 in the direction A causes the pin and indicator member 230 to rotate about the axis 203 in the direction indicated generally by the arrow $R_1$ (clockwise about the axis 203 as viewed in FIG. 9).

When longitudinal movement of the piston 202 in the direction A ceases due to the pin 222 reaching the end of the first recess 208, the indication arrangement 200 and, in particular, the indicator member 230 is oriented in a first condition in which the sections 236a are located at the left and right sides of the indicator member extending the entire length of the annular surface 232. The housing 42 of the valve assembly 40' has a viewing window (not shown) configured to make visible only the left and right sides of the indicator member 230 while obstructing or covering the top and bottom of the indicator member. Accordingly, when the indication arrangement 200 is in the first (low pressure) condition the sections 236a are visible while the sections 236b are not visible. Visibility of the sections 236a indicates that the fluid pressure within the pressure chambers 62a, 62b is below a threshold amount corresponding with the spring bias of the spring 212.

Similar to the valve assembly 40 of FIGS. 1-7, the viewing window of the valve assembly 40' of FIGS. 8-10 advantageously allows the left and right sides of the indicator member 230 to be viewed from multiple directions, e.g., top, left side, right side, and front of the housing 42 (not shown).

The fluid pressure inside the second passage 62b acts against the first end 204 of the piston 202 and against the spring bias of the spring 212. When the fluid pressure reaches or exceeds a predetermined amount, e.g., 500 psi, the spring bias is overcome and the piston 202 is pushed in the direction indicated generally by the arrow B in FIG. 10 towards the end cap 64'. Since the pin 220 extends into the second recess 220 and pin 222 prevents rotation of the piston 202, longitudinal movement of the piston 202 in the direction B causes the pin and indicator member 230 to rotate about the axis 203 in the direction indicated generally by the arrow $R_2$ (counterclockwise about the axis 203 as viewed in FIG. 10).

When longitudinal movement of the piston 202 in the direction B ceases due to the pin 222 reaching the end of the first recess 208, the indicating assembly 200 and, in particular, the indicator member is oriented in a second condition. In this second condition orientation, the sections 236b are now located at the visible left and right sides of the indicator member extending the entire length of the annular surface 232. Accordingly, when the indication arrangement 200 is in the second (high or normal pressure) condition the sections 236b are visible while the sections 236a are not visible. Visibility of the sections 236b indicates that the fluid pressure within the pressure chambers 62a, 62b is above the threshold amount.

When the fluid pressure within the valve assembly 40' thereafter decreases, the fluid pressure acting on the first end 204 of the piston 202 likewise decreases. At some point, the reduced fluid pressure is insufficient to overcome the bias of the spring 212. Consequently, the spring 212 moves the piston 202 back in the direction A until the indicator member 230 rotates back to the first condition, thereby making only the sections 236a viewing through the viewing window 46.

It is clear from the above that the piston 202 rotates the indicator member 230 based upon the fluid pressure within the valve assembly 40'. Since the segments 236a and 236b of the indicator member 230 are visually distinct from one another, e.g., color, texture, fluorescence, etc., the indicating assembly 200 of the present disclosure therefore provides visual indication of the fluid pressure within the valve assembly 40' and the container 30.

It will be understood that the spring 112, 212 used in either indicating device 100, 200 of the present disclosure may be selected to provide visual indicator of any particular threshold fluid pressure level. For example, the spring bias may be configured such that the first portion 132 is exposed through the viewing window 46 only when the fluid pressure exceeds a threshold value indicative of "high" pressure, e.g., above 500 psi, and the second portion 140 is exposed through the viewing window 46 only when the fluid pressure is below the threshold value indicative of a "low" pressure, e.g., below 500 psi. Providing a spring 112, 212 having a higher biasing force results in higher fluid pressure required to overcome the spring force and, thus, the "high" pressure indication threshold is greater. Likewise, providing a spring 112, 212 having a lower biasing force results in lower fluid pressure required to overcome the spring force and, thus, the "high" pressure indication threshold is lower.

Figure 16:
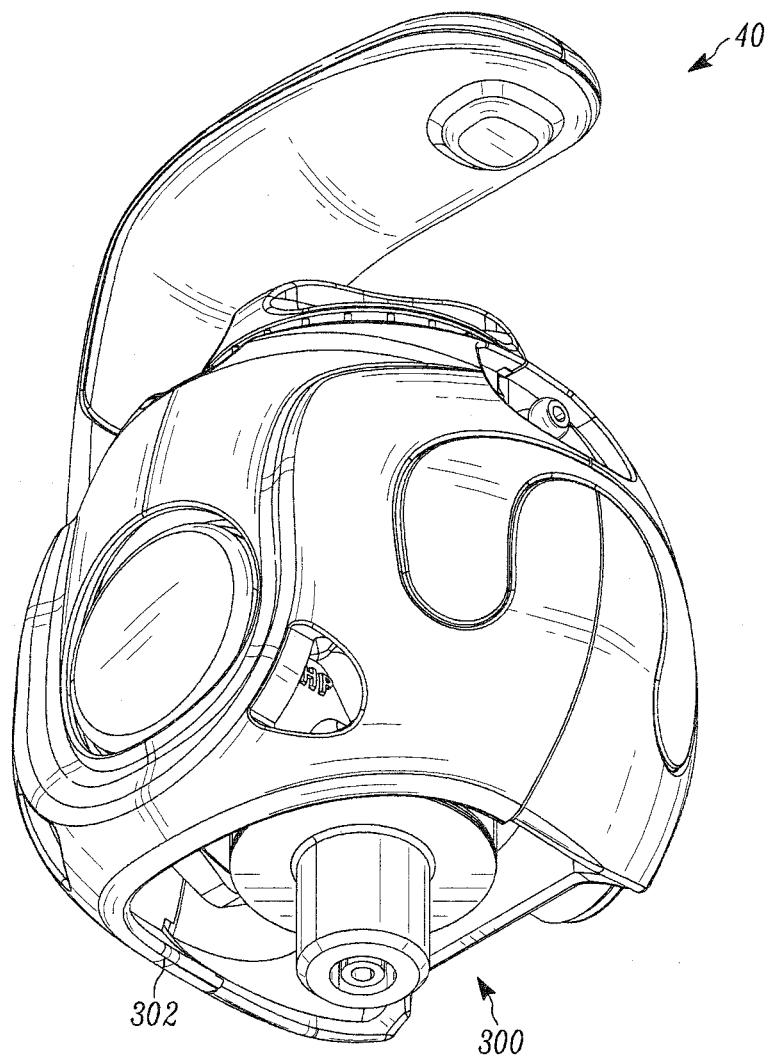
Figure 17:
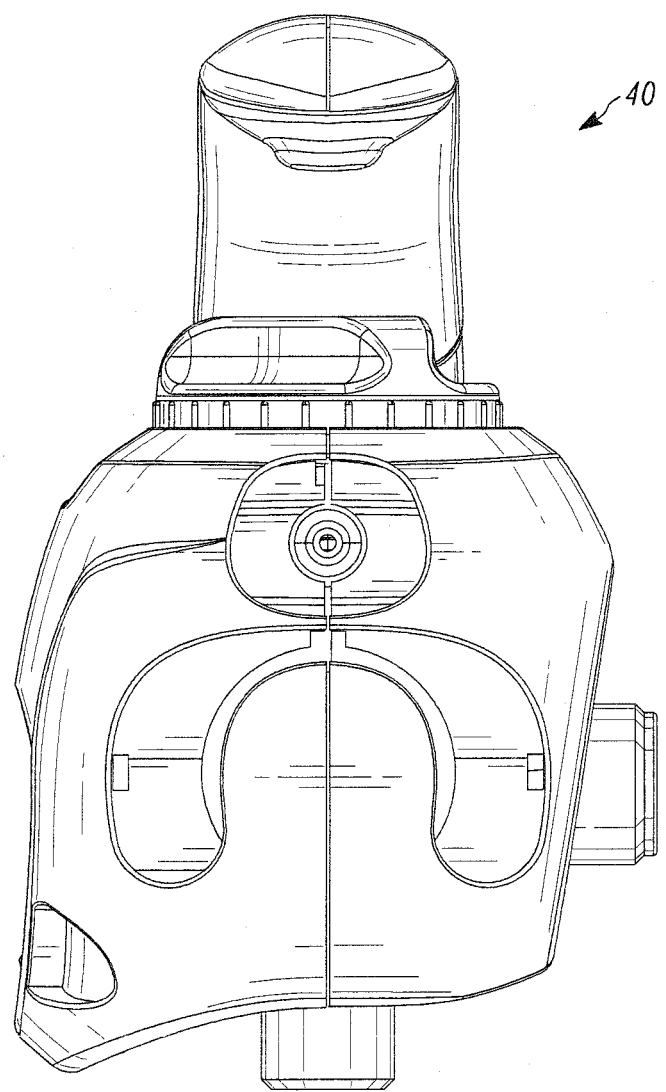
Figure 18:
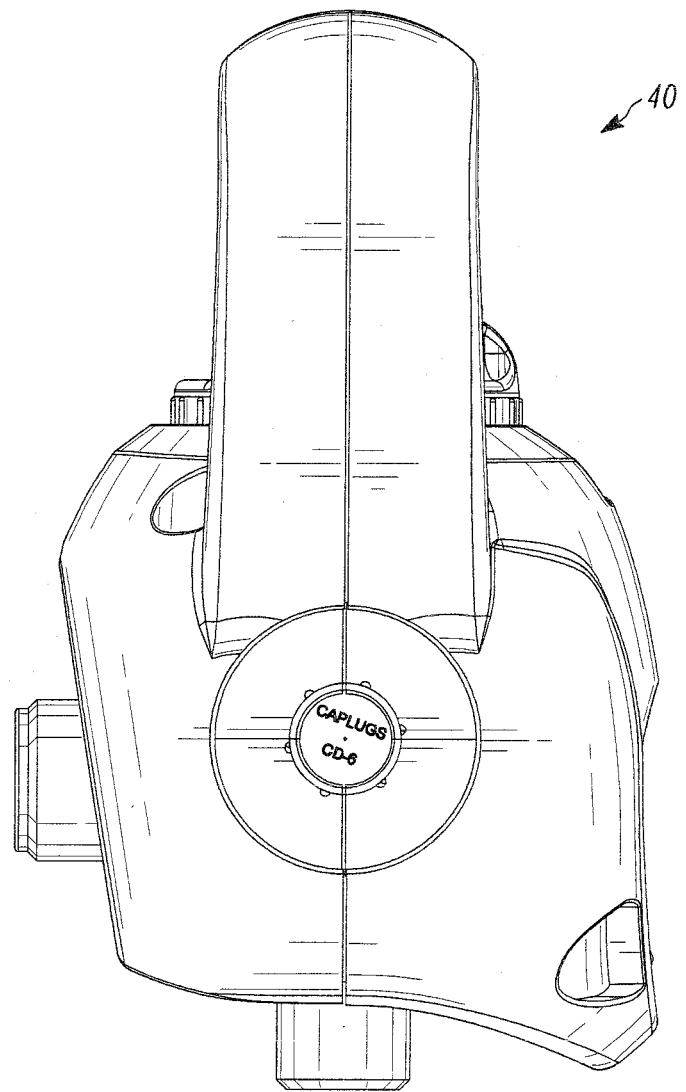
Figure 19:
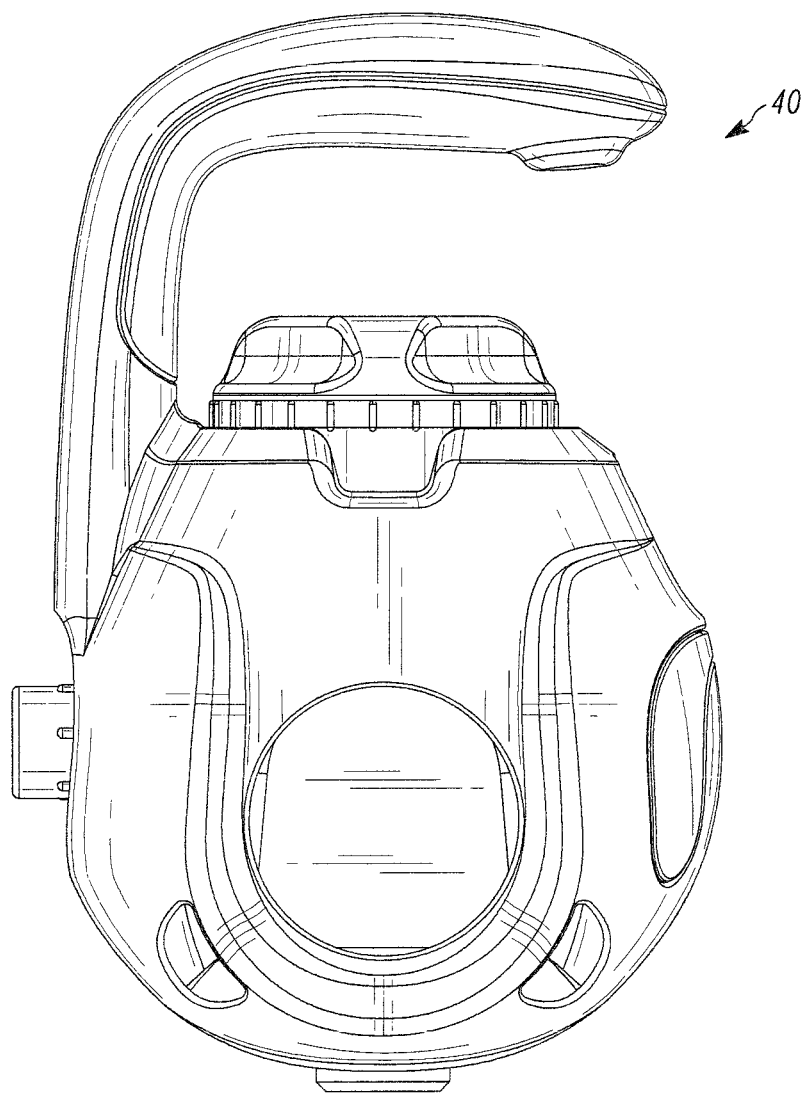
Figure 20:
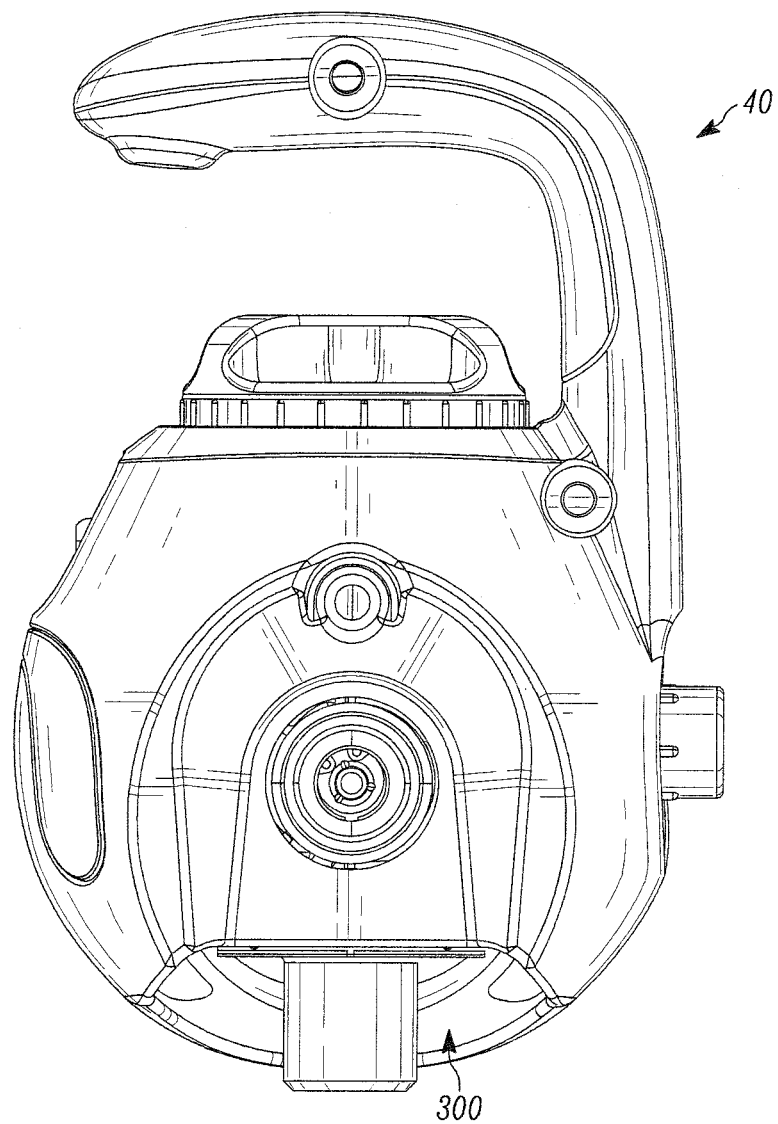
Figure 21:
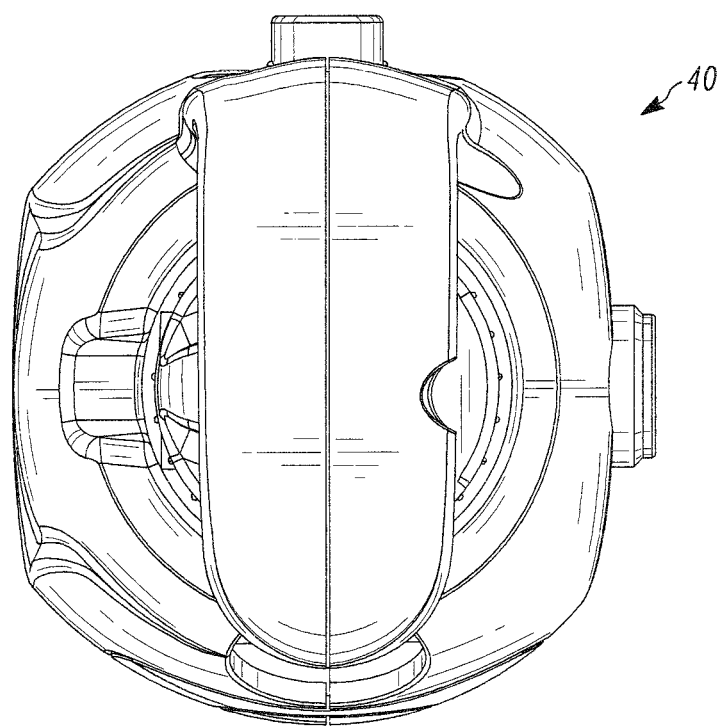
Figure 22:
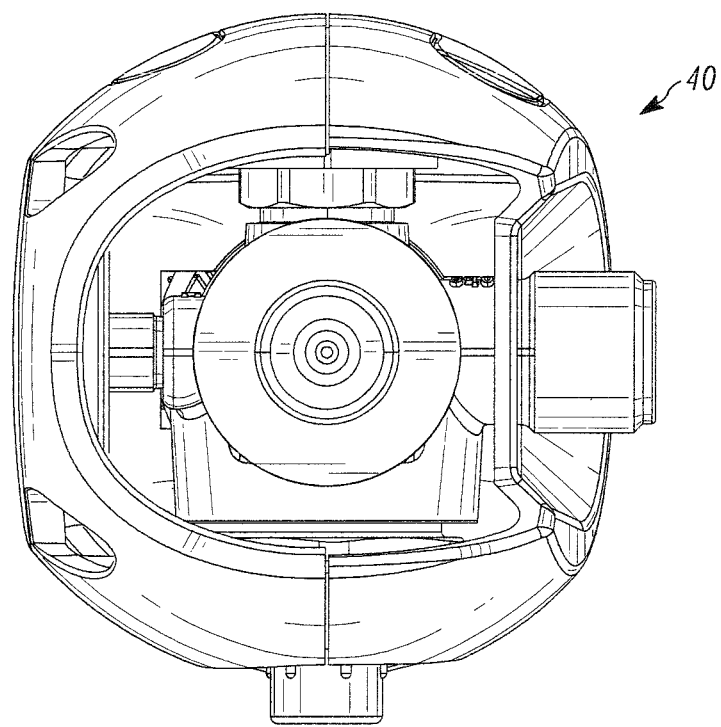
Figure 23:
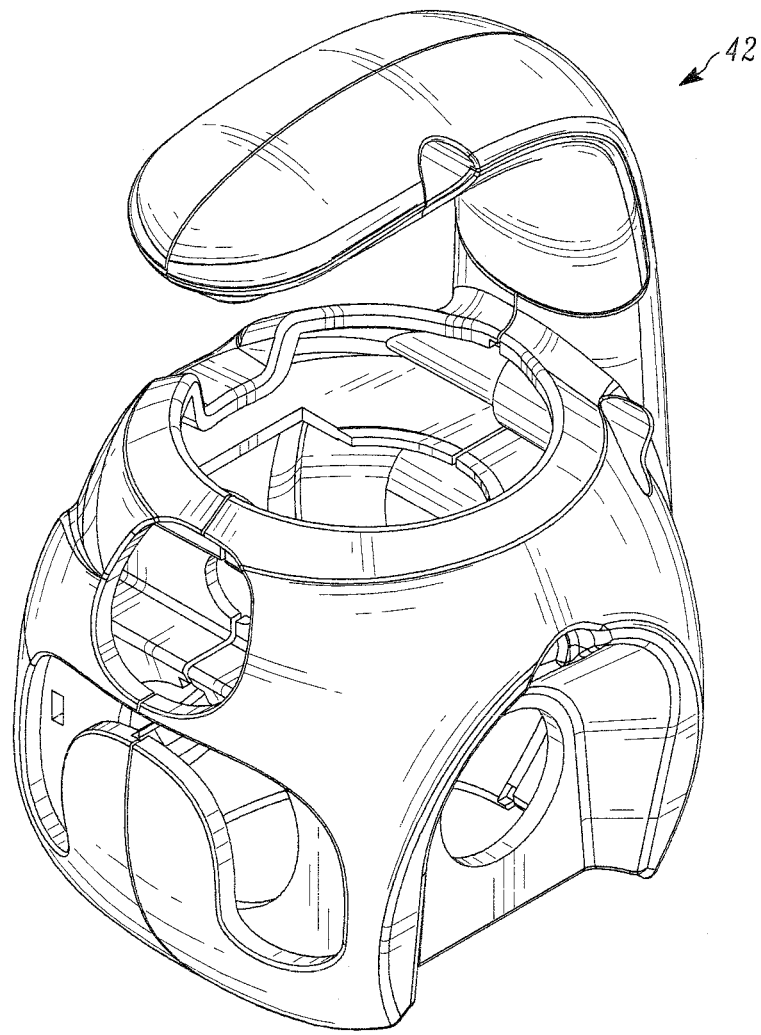
FIGS. 23-32 are various views of a valve assembly housing or shroud in accordance with another example embodiment of the present disclosure.
Figure 24:
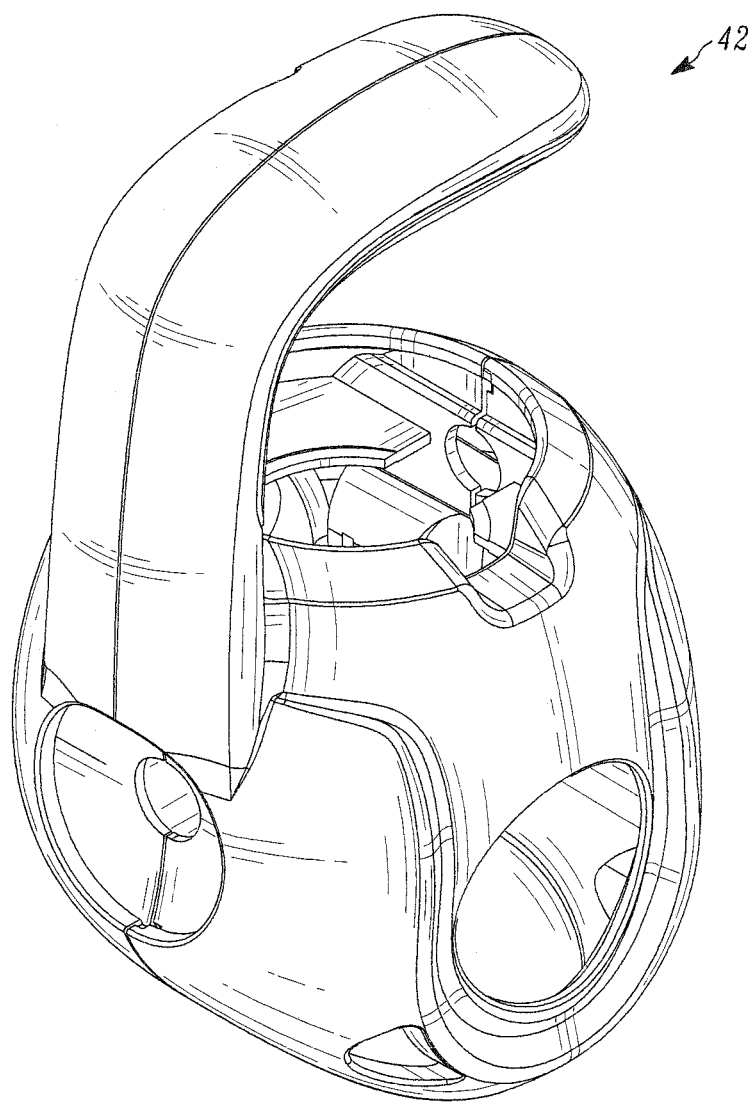
Figure 25:
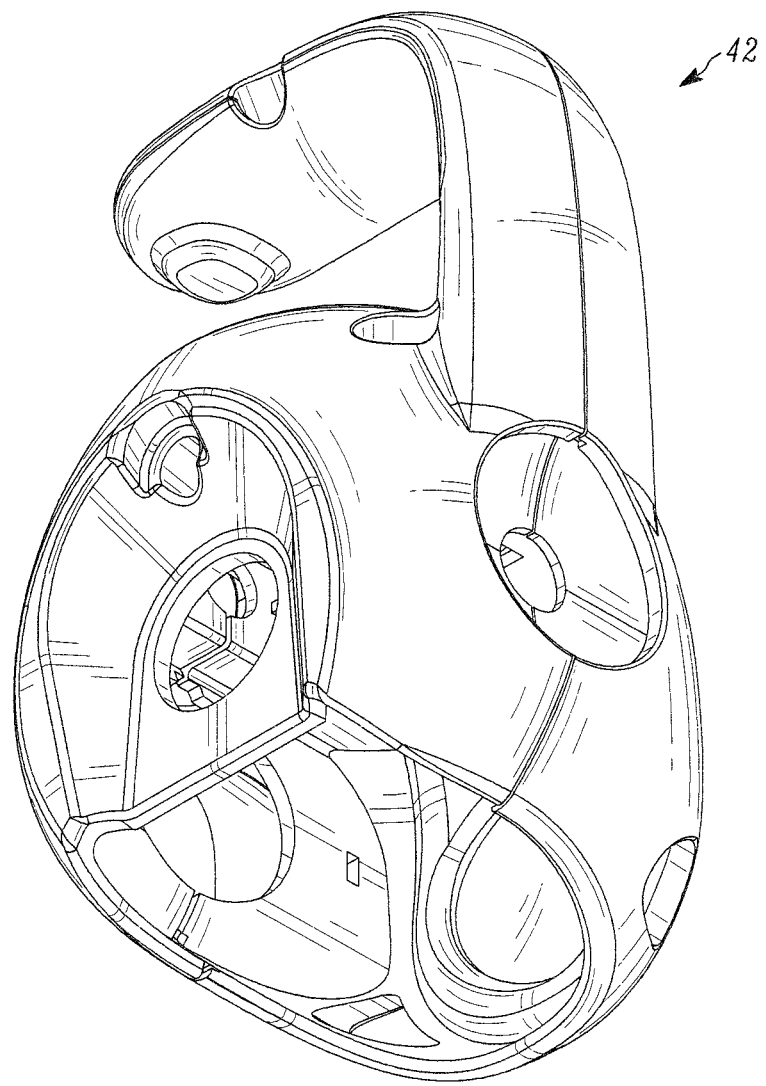
Figure 26:
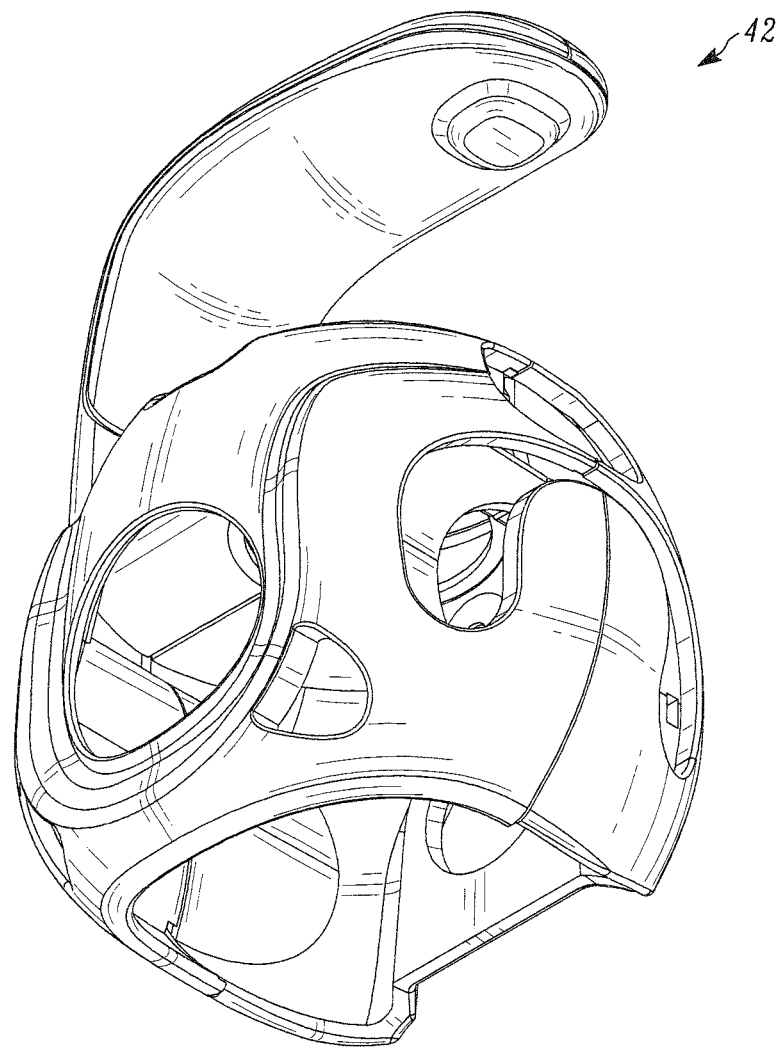
Figure 27:
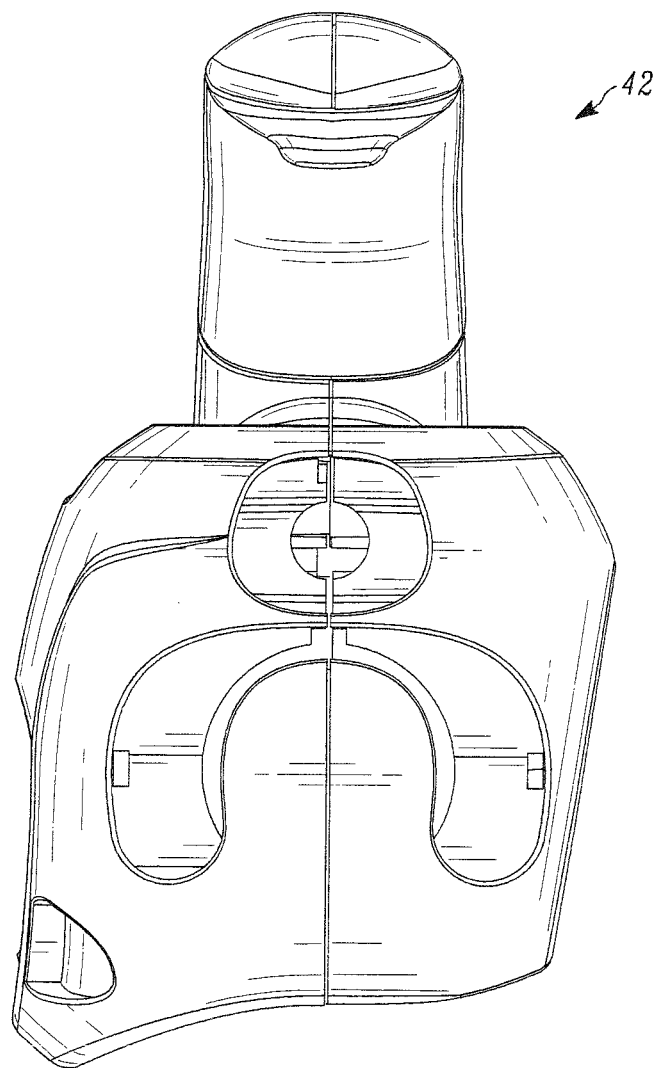
Figure 28:
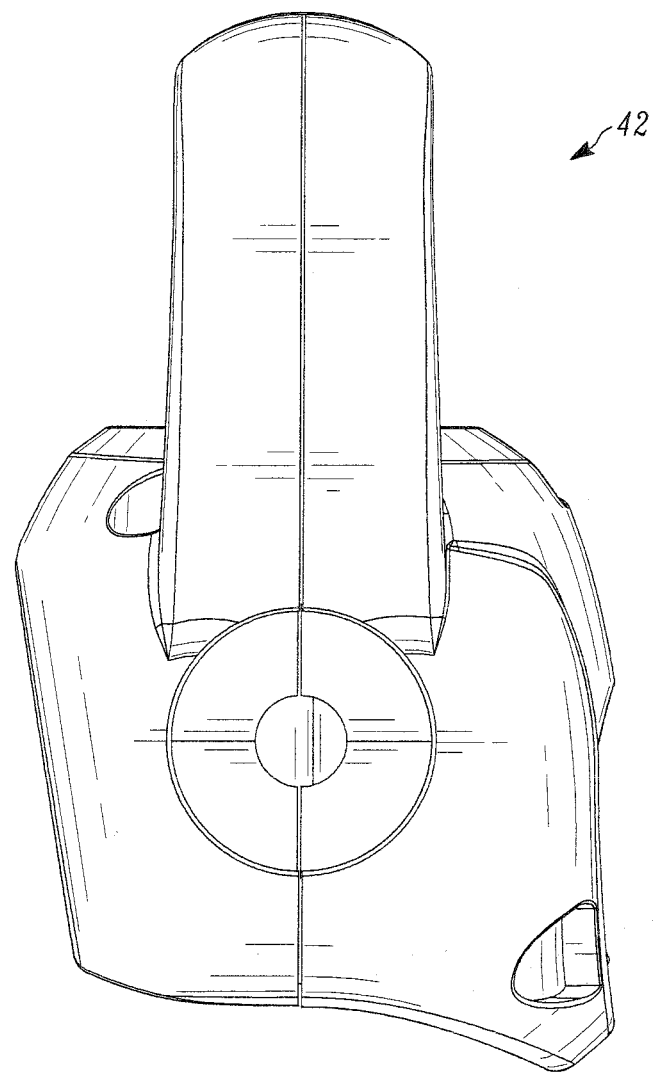
Figure 29:
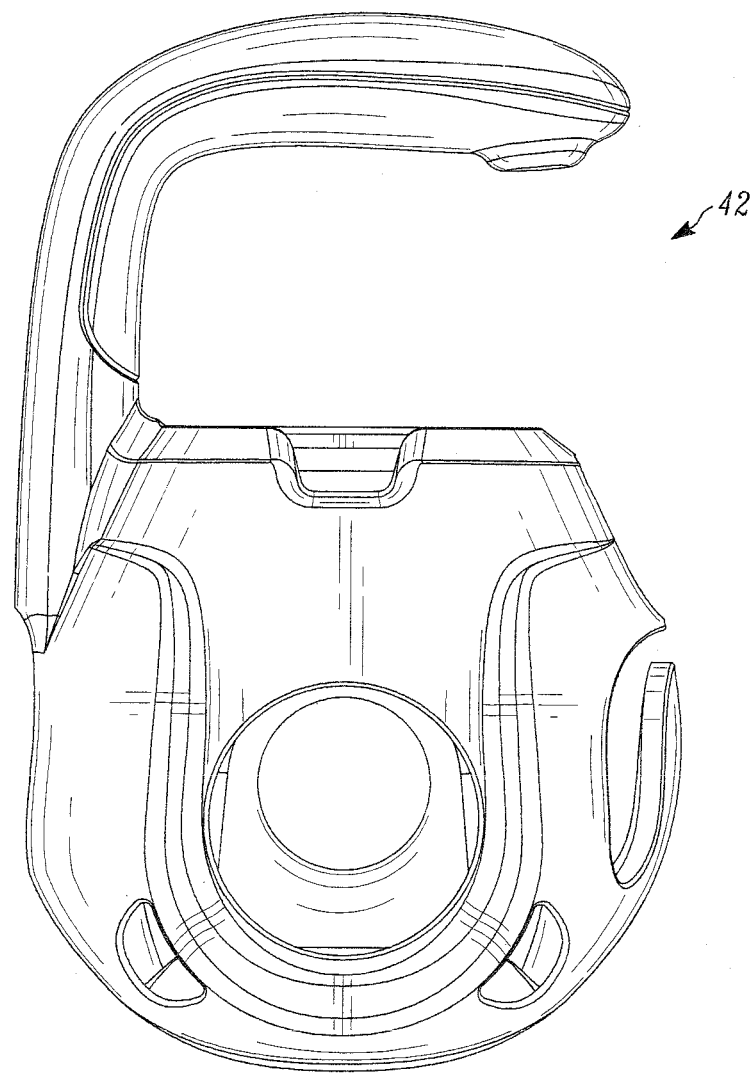
Figure 30:
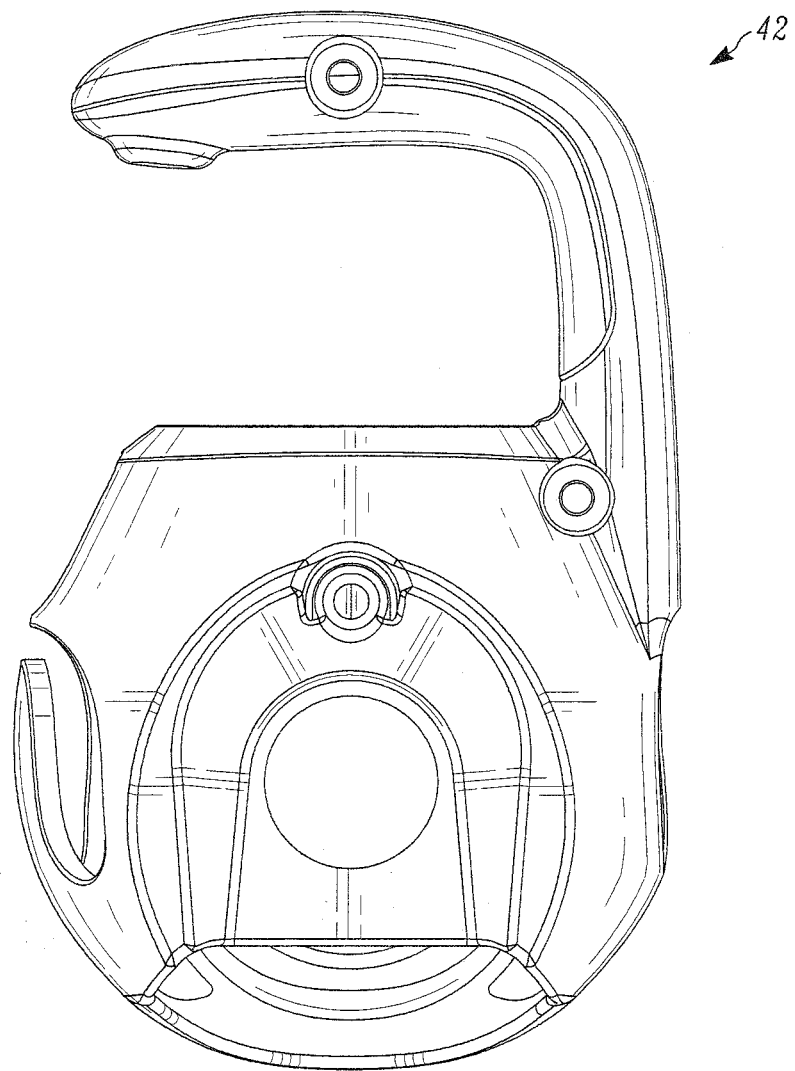
Figure 31:
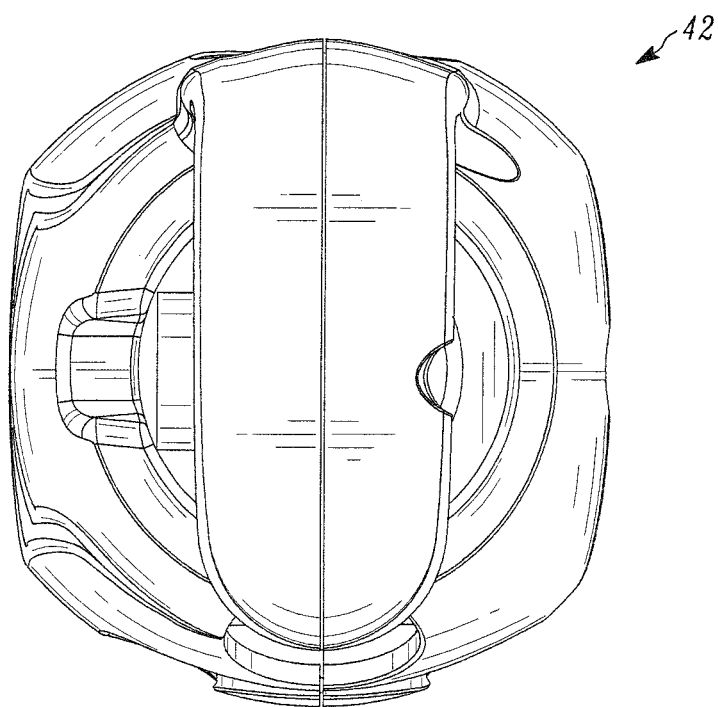
Figure 32:
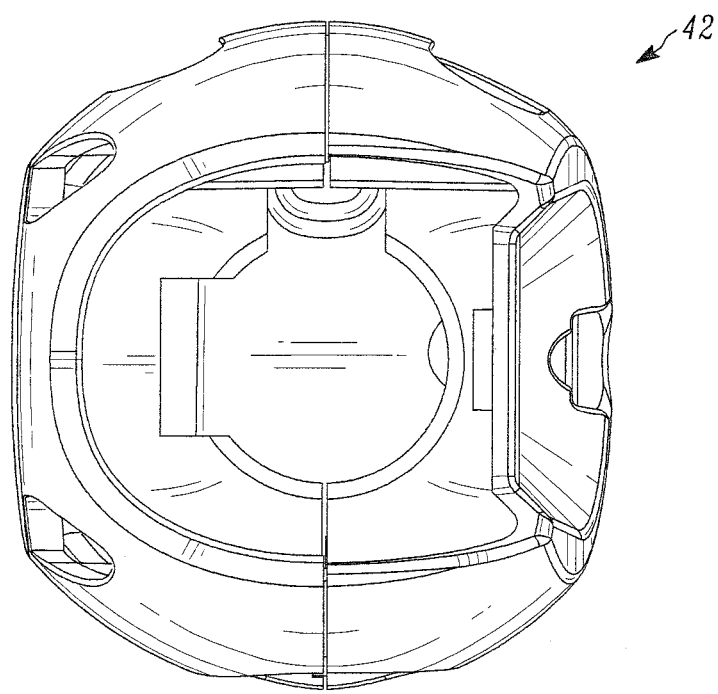

FIGS. 13-22 are various views of a valve assembly 40 constructed in accordance with one example embodiment of the present disclosure. FIGS. 23-32 are various views of a valve assembly housing or shroud 42 in accordance with another example embodiment of the present disclosure. In the illustrated example embodiment, the shroud 42 is made of molded plastic and substantially gourd-shaped, having a recessed opening 300 along a bottom cavity 302. The recessed opening 300, as seen in FIGS. 16 and 20 provides access to a wrench or tool for the removal or attachment of the valve assembly 40 to the pressurized container 30.

The preferred embodiments of the disclosure have been illustrated and described in detail. However, the present disclosure is not to be considered limited to the precise construction disclosed. Various adaptations, modifications and uses of the disclosure may occur to those skilled in the art to which the disclosure relates and the intention is to cover hereby all such adaptations, modifications, and uses which fall within the spirit or scope of the appended claims.

Having described the present disclosure, the following is claimed:

1. An indication arrangement for a container in which pressurized fluid is stored comprising:
    a valve assembly connected to the pressurized container and having a fluid passage for receiving the pressurized fluid;
    a piston movable within the valve assembly along a longitudinal axis in response to fluid pressure within the fluid passage; and
    an indicating member including a moving first indicator portion and a non-moving second indicator portion, the first indicator portion being movable in response to longitudinal movement of the piston between a first condition exposing the second indicator portion to represent fluid pressure below a threshold pressure and a second condition covering the second indicator portion to represent fluid pressure above the threshold pressure.

2. The arrangement according to claim 1, wherein the arrangement is contained within a housing such that said indicator member is at least one of luminescent and fluorescent.

3. The arrangement according to claim 2, wherein the indicating member is positioned within a housing having a viewing window for discerning the condition of the indicating member and the fluid pressure in a container that is in fluid communication with the arrangement during use.

4. The arrangement according to claim 1, wherein the indicator member includes feedback indicia comprising at least one of text and markings indicative of pressure.

5. The arrangement according to claim 1, wherein the indicating member is positioned within a housing having a viewing window for discerning the condition of the indicating member and the fluid pressure in a container that is in fluid communication with the arrangement during use.

6. The arrangement according to claim 5, wherein the viewing window is substantially U-shaped.

7. The arrangement according to claim 1, wherein the first indicator portion encircles the second indicator when in the second condition representing fluid pressure above the threshold pressure.

8. A method of indicating pressure container contents, such as pressure in a cylinder valve assembly comprising:
    moving a piston in fluid communication with a high pressure port, the piston being coupled to a first indicator portion of an indicator member that moves relative to a stationary second indicator portion to a high position covering the second indicator portion based on the gas pressure, the piston moving the first indicator portion under the influence of a spring bias to a low position exposing the second indicator portion when the spring force is more than the resulting gas force to indicate low pressure and a shroud design that allows the indicator member to be viewable in multiple viewing directions through a viewable lens.

9. The method according to claim 8 wherein moving the first indicator portion covers the non-moving second indicator portion to reveal a different color when the cylinder contents pressure is low.

10. The method according to claim 8, wherein the spring may be tuned to indicate different low pressure values of about 400 psi to about 500 psi.

11. The method according to claim 8, wherein the indicator member is configured to move in other directions such as vertical, horizontal or angular.

12. The method of claim 8, wherein the lens can have optical properties that can magnify the indicating state of the indicator member.

13. The method according to claim 8, wherein the piston moves the first indicator portion to encircle the second indicator portion to indicate low pressure.

14. A pressure indication assembly for a container in which pressurized fluid is stored, the pressure indication assembly comprising:
    a valve assembly connected during use to a pressurized container and having a fluid passage for receiving the pressurized fluid; and
    a piston movable within the valve assembly along a longitudinal axis in response to fluid pressure within the fluid passage, the piston further being coupled to a pin that is further coupled to an indicating member, the piston facilitating rotational movement of the pin and said indicator member during use based on relative gas pressure within the pressurized container, said piston including a helical track to rotationally guide the pin and indicator member during use;

the indicating member rotatably movable in response to longitudinal movement of the piston between a first condition providing a first indicator portion representing fluid pressure below a threshold pressure and a second condition providing a second indicator portion representing fluid pressure above the threshold pressure, the first indicator portion including a plurality of first segments and the second indicator portion including a plurality of second segments visually distinct from the first segments, the first segments alternating with the second segments on a surface of the indicating member and about an axis of the indicating member.

15. The assembly according to claim 14, wherein the indicating member is positioned within a housing having a viewing window for discerning the condition of the indicating member and the fluid pressure in a pressurized container that is in fluid communication with the assembly during use.

16. The assembly according to claim 15, wherein the viewing window is substantially U-shaped.

\* \* \* \* \*